(12) United States Patent
Osterhout et al.

(10) Patent No.: US 12,717,147 B2
(45) Date of Patent: Aug. 25, 2026

(54) STRAY LIGHT SUPPRESSION FOR HEAD WORN COMPUTING

(71) Applicant: Mentor Acquisition One, LLC, Plantation, FL (US)

(72) Inventors: Ralph F. Osterhout, San Francisco, CA (US); John N. Border, Campbell, CA (US); Edward H. Nortrup, Stoneham, MA (US)

(73) Assignee: Mentor Acquisition One, LLC, Plantation, FL (US)

( * ) Notice: Subject to any disclaimer, the term of this patent is extended or adjusted under 35 U.S.C. 154(b) by 0 days.

(21) Appl. No.: 19/211,031

(22) Filed: May 16, 2025

(65) Prior Publication Data

US 2025/0277983 A1 Sep. 4, 2025

Related U.S. Application Data

(63) Continuation of application No. 18/770,487, filed on Jul. 11, 2024, now Pat. No. 12,326,565, which is a (Continued)

(51) Int. Cl.
*G02B 27/01* (2006.01)
*G02B 5/30* (2006.01)

(Continued)

(52) U.S. Cl.
CPC .......... *G02B 27/0172* (2013.01); *G02B 5/30* (2013.01); *G02B 27/0101* (2013.01);

(Continued)

(58) Field of Classification Search
CPC .. G02B 27/0172; G02B 5/30; G02B 27/0101; G02B 27/017; G02B 27/0176;

(Continued)

(56) References Cited

U.S. PATENT DOCUMENTS

| | | | |
|---|---|---|---|
| 1,897,833 | A | 2/1933 | Benway |
| 4,852,988 | A | 8/1989 | Velez |

(Continued)

FOREIGN PATENT DOCUMENTS

| | | | |
|---|---|---|---|
| CA | 2316473 | A1 | 1/2001 |
| CA | 2362895 | A1 | 12/2002 |

(Continued)

OTHER PUBLICATIONS

Bezryadin, et al. "Brightness Calculation in Digital Image Processing," Technologies for Digital Fulfillment 2007, Las Vegas, NV, 2007, pp. 1-6.

(Continued)

*Primary Examiner* — Hang Lin
(74) *Attorney, Agent, or Firm* — Vista IP Law Group, LLP

(57) ABSTRACT

Aspects of the present disclosure relate to a computer display stray-light suppression system for a head-worn computer comprising an eye cover including a flexible material with a perimeter, wherein the perimeter is formed to substantially encapsulate an eye of a person, and the eye cover including an attachment system adapted to removably and replaceably attach to a perimeter of the head-worn computer to suppress light emitted from a computer display in the head-worn computer.

20 Claims, 27 Drawing Sheets

Related U.S. Application Data continuation of application No. 18/456,352, filed on Aug. 25, 2023, now Pat. No. 12,066,635, which is a continuation of application No. 16/775,866, filed on Jan. 29, 2020, now Pat. No. 11,782,274, which is a continuation of application No. 15/904,487, filed on Feb. 26, 2018, now Pat. No. 10,578,874, which is a continuation of application No. 14/811,258, filed on Jul. 28, 2015, now Pat. No. 9,939,646, which is a continuation of application No. 14/185,987, filed on Feb. 21, 2014, now Pat. No. 9,122,054, which is a continuation of application No. 14/163,646, filed on Jan. 24, 2014, now Pat. No. 9,400,390.

(51) Int. Cl.
*G06F 1/16* (2006.01)
*G06F 3/01* (2006.01)
*G06F 5/10* (2006.01)

(52) U.S. Cl.
CPC ....... *G02B 27/017* (2013.01); *G02B 27/0176* (2013.01); *G06F 1/163* (2013.01); *G06F 3/011* (2013.01); *G06F 3/013* (2013.01); *G06F 5/10* (2013.01); *G02B 2027/0118* (2013.01); *G02B 2027/014* (2013.01); *G02B 2027/0178* (2013.01)

(58) Field of Classification Search
CPC ...... G02B 2027/0118; G02B 2027/014; G02B 2027/0178; G06F 1/163
See application file for complete search history.

(56) References Cited

U.S. PATENT DOCUMENTS

D327,674 S 7/1992 Kuo
5,272,757 A 12/1993 Scofield
D376,790 S 12/1996 Taylor
5,596,451 A 1/1997 Handschy
5,621,424 A 4/1997 Shimada
5,717,422 A 2/1998 Fergason
5,808,800 A 9/1998 Handschy
5,886,822 A 3/1999 Spitzer
5,949,583 A 9/1999 Rallison
6,099,117 A 8/2000 Gregory
6,160,666 A 12/2000 Rallison
6,195,136 B1 2/2001 Handschy
6,222,677 B1 4/2001 Budd
6,359,723 B1 3/2002 Handschy
6,369,952 B1 * 4/2002 Rallison ............ G02B 27/0176 359/630
6,433,760 B1 8/2002 Vaissie
6,456,438 B1 9/2002 Lee
6,491,391 B1 12/2002 Blum et al.
D470,144 S 2/2003 Li
6,535,182 B2 3/2003 Stanton
D473,871 S 4/2003 Santos
6,847,336 B1 1/2005 Lemelson
6,943,754 B2 9/2005 Aughey
6,977,776 B2 12/2005 Volkenandt et al.
6,987,787 B1 1/2006 Mick
7,016,116 B2 3/2006 Dolgoff
7,088,234 B2 8/2006 Naito
7,199,934 B2 4/2007 Yamasaki
7,206,134 B2 4/2007 Weissman
7,347,551 B2 3/2008 Fergason et al.
7,457,040 B2 11/2008 Amitai
7,488,294 B2 2/2009 Torch
7,646,540 B2 1/2010 Dolgoff
7,728,799 B2 6/2010 Kerr
7,830,370 B2 11/2010 Yamazaki
7,855,743 B2 12/2010 Sako
7,928,926 B2 4/2011 Yamamoto
8,004,765 B2 8/2011 Amitai
8,018,579 B1 9/2011 Krah
8,166,421 B2 4/2012 Magal
8,212,859 B2 7/2012 Tang
8,228,315 B1 7/2012 Starner
8,235,529 B1 8/2012 Raffle
8,246,170 B2 8/2012 Yamamoto
8,378,924 B2 2/2013 Jacobsen
8,427,396 B1 4/2013 Kim
8,494,215 B2 7/2013 Kimchi
8,564,883 B2 10/2013 Totani
8,570,273 B1 10/2013 Smith
8,576,276 B2 11/2013 Bar-zeev
8,576,491 B2 11/2013 Takagi
8,587,869 B2 11/2013 Totani
8,594,467 B2 11/2013 Lu
8,611,015 B2 12/2013 Wheeler
8,638,498 B2 1/2014 Bohn et al.
8,662,686 B2 3/2014 Takagi
8,670,183 B2 3/2014 Clavin
8,696,113 B2 4/2014 Lewis
8,698,157 B2 4/2014 Hanamura
8,711,487 B2 4/2014 Takeda
8,743,052 B1 6/2014 Keller
8,745,058 B1 6/2014 Garcia-barrio
8,750,541 B1 6/2014 Dong
8,752,963 B2 6/2014 Mcculloch
8,760,765 B2 6/2014 Gupta
8,787,006 B2 7/2014 Golko
8,803,867 B2 8/2014 Oikawa
8,823,071 B2 9/2014 Oyamada
8,832,557 B2 9/2014 Fadell
8,837,880 B2 9/2014 Takeda
8,867,139 B2 10/2014 Gupta
8,922,530 B2 12/2014 Pance
8,929,589 B2 1/2015 Publicover et al.
9,010,929 B2 4/2015 Lewis
9,046,686 B2 6/2015 Saito
9,100,732 B1 8/2015 Dong
9,122,054 B2 9/2015 Osterhout
9,269,193 B2 2/2016 Saito
9,274,338 B2 3/2016 Robbins et al.
9,292,973 B2 3/2016 Bar-zeev et al.
9,323,325 B2 4/2016 Perez et al.
9,329,387 B2 5/2016 Border
9,400,390 B2 7/2016 Osterhout
9,482,880 B1 11/2016 Chandrasekhar
9,651,784 B2 5/2017 Osterhout
9,658,457 B2 5/2017 Osterhout
9,658,458 B2 5/2017 Osterhout
9,715,112 B2 7/2017 Border
9,720,227 B2 8/2017 Border
9,720,505 B2 8/2017 Gribetz et al.
9,753,288 B2 9/2017 Osterhout
9,826,299 B1 11/2017 Osterhout
9,841,599 B2 12/2017 Border
9,846,308 B2 12/2017 Osterhout
9,880,441 B1 1/2018 Osterhout
9,939,646 B2 4/2018 Osterhout
10,013,053 B2 7/2018 Cederlund et al.
10,025,379 B2 7/2018 Drake et al.
10,578,874 B2 3/2020 Osterhout et al.
11,782,274 B2 10/2023 Osterhout
12,066,635 B2 8/2024 Osterhout
12,326,565 B2 6/2025 Osterhout et al.
2002/0005108 A1 1/2002 Ludwig
2002/0021498 A1 2/2002 Ohtaka
2003/0030597 A1 2/2003 Geist
2003/0068057 A1 4/2003 Miller
2004/0008157 A1 * 1/2004 Brubaker ............ G02B 27/017 345/8
2006/0003803 A1 1/2006 Thomas
2006/0023158 A1 2/2006 Howell et al.
2006/0238550 A1 10/2006 Page
2007/0215161 A1 9/2007 Frater et al.
2008/0191965 A1 8/2008 Pandozy
2008/0198324 A1 8/2008 Fuziak
2009/0279180 A1 11/2009 Amitai
2010/0046075 A1 2/2010 Powell

(56) References Cited

U.S. PATENT DOCUMENTS

2010/0079356 A1 4/2010 Hoellwarth
2010/0130140 A1 5/2010 Waku
2011/0130958 A1 6/2011 Stahl
2011/0131495 A1 6/2011 Bull
2011/0164047 A1 7/2011 Pance
2011/0164163 A1 7/2011 Bilbrey
2011/0196610 A1 8/2011 Waldman
2011/0199171 A1 8/2011 Prest
2011/0201213 A1 8/2011 Dabov
2011/0202823 A1 8/2011 Berger
2011/0211056 A1 9/2011 Publicover et al.
2011/0213664 A1* 9/2011 Osterhout ............... G06F 3/013 705/14.58
2011/0221672 A1 9/2011 Osterhout
2012/0021806 A1 1/2012 Maltz
2012/0035934 A1 2/2012 Cunningham
2012/0050493 A1 3/2012 Ernst
2012/0062850 A1 3/2012 Travis
2012/0075168 A1 3/2012 Osterhout
2012/0105473 A1 5/2012 Bar-zeev et al.
2012/0113514 A1 5/2012 Rodman
2012/0188245 A1 7/2012 Hyatt
2012/0212593 A1 8/2012 Na
2012/0223885 A1 9/2012 Perez
2012/0242251 A1 9/2012 Kwisthout
2012/0250152 A1 10/2012 Larson
2012/0264510 A1 10/2012 Wigdor
2012/0306850 A1 12/2012 Balan
2012/0327116 A1 12/2012 Liu
2013/0009366 A1 1/2013 Hannegan
2013/0044042 A1 2/2013 Olsson
2013/0050067 A1* 2/2013 Yamashita ........... G09G 3/3233 345/76
2013/0077147 A1 3/2013 Efimov
2013/0083055 A1 4/2013 Piemonte
2013/0100259 A1 4/2013 Ramaswamy
2013/0120841 A1 5/2013 Shpunt
2013/0135198 A1 5/2013 Hodge
2013/0154913 A1 6/2013 Genc
2013/0196757 A1 8/2013 Latta
2013/0207970 A1 8/2013 Shpunt
2013/0230215 A1 9/2013 Gurman
2013/0249778 A1 9/2013 Morimoto
2013/0249787 A1 9/2013 Morimoto
2013/0257622 A1 10/2013 Davalos
2013/0265227 A1 10/2013 Julian
2013/0321265 A1 12/2013 Bychkov
2013/0321271 A1 12/2013 Bychkov
2013/0335461 A1 12/2013 Rekimoto
2013/0335573 A1 12/2013 Forutanpour
2014/0028704 A1 1/2014 Wu
2014/0043682 A1 2/2014 Hussey
2014/0062854 A1 3/2014 Cho
2014/0063473 A1 3/2014 Pasolini
2014/0101608 A1 4/2014 Ryskamp
2014/0129328 A1 5/2014 Mathew
2014/0146394 A1 5/2014 Tout
2014/0147829 A1 5/2014 Jerauld
2014/0152530 A1 6/2014 Venkatesha
2014/0152558 A1 6/2014 Salter
2014/0152676 A1 6/2014 Rohn
2014/0159995 A1 6/2014 Adams
2014/0160055 A1 6/2014 Margolis
2014/0160157 A1 6/2014 Poulos
2014/0160170 A1 6/2014 Lyons
2014/0168735 A1 6/2014 Yuan
2014/0176603 A1 6/2014 Kumar
2014/0177023 A1 6/2014 Gao
2014/0195918 A1 7/2014 Friedlander
2014/0253605 A1* 9/2014 Border ..................... G09G 5/10 345/690
2014/0306882 A1 10/2014 Johansen et al.
2015/0168731 A1 6/2015 Robbins
2015/0205112 A1 7/2015 Border
2015/0205128 A1 7/2015 Border
2015/0212324 A1 7/2015 Osterhout
2015/0212327 A1 7/2015 Osterhout
2015/0243082 A1* 8/2015 Ueno ................. G02B 27/0172 345/633
2015/0245131 A1 8/2015 Facteau
2015/0261015 A1 9/2015 Han
2015/0264467 A1 9/2015 Annunziato
2015/0338661 A1 11/2015 Osterhout
2015/0355466 A1 12/2015 Border
2016/0033772 A1 2/2016 Han
2016/0109709 A1 4/2016 Osterhout
2016/0109713 A1 4/2016 Osterhout
2016/0116738 A1 4/2016 Osterhout
2016/0116745 A1 4/2016 Osterhout
2016/0147309 A1 5/2016 Li
2016/0161747 A1 6/2016 Osterhout
2016/0171846 A1 6/2016 Brav
2017/0123213 A1 5/2017 Border
2017/0219831 A1 8/2017 Haddick
2017/0343820 A1 11/2017 Osterhout
2018/0003988 A1 1/2018 Osterhout
2018/0035101 A1 2/2018 Osterhout
2018/0045967 A1 2/2018 Osterhout

FOREIGN PATENT DOCUMENTS

CA 2388766 A1 12/2003
EP 368898 A1 5/1990
EP 777867 A1 6/1997
EP 2486450 A1 8/2012
EP 2502410 A1 9/2012
WO 8809942 A1 12/1988
WO 9606378 A1 2/1996
WO 2010062481 A1 6/2010
WO 2011060525 A1 5/2011
WO 2011143655 A1 11/2011
WO 2012058175 A1 5/2012
WO 2013050650 A1 4/2013
WO 2013103825 A1 7/2013
WO 2013110846 A1 8/2013
WO 2013170073 A1 11/2013

OTHER PUBLICATIONS

Clements-Cortes, et al. "Short-Term Effects of Rhythmic Sensory Stimulation in Alzheimer's Disease: An Exploratory Pilot Study," Journal of Alzheimer's Disease 52 (2016), IOS Press Feb. 9, 2016, pp. 651-660.

Final Office Action mailed Apr. 26, 2023, for U.S. Appl. No. 16/775,866, filed Jan. 29, 2020, 17 pages.

Final Office Action mailed Aug. 20, 2021, for U.S. Appl. No. 16/775,866, filed Jan. 29, 2020, 18 pages.

Final Office Action mailed Mar. 29, 2022, for U.S. Appl. No. 16/775,866, filed Jan. 29, 2020, 15 pages.

Final Office Action mailed Oct. 14, 2022, for U.S. Appl. No. 16/775,866, filed Jan. 29, 2020, 15 pages.

Jacob, R. "Eye Tracking in Advanced Interface Design", Virtual Environments and Advanced Interface Design, Oxford University Press, Inc. (Jun. 1995).

Logbar Inc., "Ring: Shortcut Everything", https://www.kickstarter.com/projects/1761670738/ring-shortcut-everything, Dec. 2014, 22 pages.

Non-Final Office Action mailed Apr. 14, 2021, for U.S. Appl. No. 16/775,866, filed Jan. 29, 2020, 15 pages.

Non-Final Office Action mailed Apr. 29, 2019, for U.S. Appl. No. 15/904,487, filed Feb. 26, 2018, 6 pages.

Non-Final Office Action mailed Dec. 8, 2021, for U.S. Appl. No. 16/775,866, filed Jan. 29, 2020, 17 pages.

Non-Final Office Action mailed Jan. 28, 2025, for U.S. Appl. No. 18/770,487, filed Jul. 11, 2024, nine pages.

Non-Final Office Action mailed Jan. 6, 2023, for U.S. Appl. No. 16/775,866, filed Jan. 29, 2020, 14 pages.

Non-Final Office Action mailed Jun. 28, 2022, for U.S. Appl. No. 16/775,866, filed Jan. 29, 2020, 16 pages.

(56) References Cited

OTHER PUBLICATIONS

Non-Final Office Action mailed Mar. 14, 2024, for U.S. Appl. No. 18/456,352, filed Aug. 25, 2023, nine pages.
Notice of Allowance mailed Apr. 17, 2025, for U.S. Appl. No. 18/770,487, filed Jul. 11, 2024, nine pages.
Notice of Allowance mailed Jul. 26, 2023, for U.S. Appl. No. 16/775,866, filed Jan. 29, 2020, 10 pages.
Notice of Allowance mailed Jun. 11, 2024, for U.S. Appl. No. 18/456,352, filed Aug. 25, 2023, nine pages.
Notice of Allowance mailed Oct. 10, 2019, for U.S. Appl. No. 15/904,487, filed Feb. 26, 2018, 8 pages.
Pamplona, Vitor R. et al., "Photorealistic Models for Pupil Light Reflex and Iridal Pattern Deformation", ACM Transactions on Graphics, vol. 28, No. 4, Article 106, Publication date: Aug. 2009, pp. 1-12.
Rolland, J. et al., "High-resolution inset head-mounted display", Optical Society of America, vol. 37, No. 19, Applied Optics, (Jul. 1, 1998).
Schedwill, "Bidirectional OLED Microdisplay", Fraunhofer Research Institution for Organics, Materials and Electronic Device COMEDD, Apr. 11, 2014, 2 pages.
Tanriverdi, V. et al. (Apr. 2000). "Interacting With Eye Movements in Virtual Environments," Department of Electrical Engineering and Computer Science, Tufts University, Medford, MA 02155, USA, Proceedings of the SIGCHI conference on Human Factors in Computing Systems, eight pages.
Vogel, et al., "Data glasses controlled by eye movements", Information and communication, Fraunhofer-Gesellschaft, Sep. 22, 2013, 2 pages.
Yoshida, A. et al., "Design and Applications of a High Resolution Insert Head Mounted Display", (Jun. 1994).
"Genius Ring Mice," http://www.geniusnet.com/Genius/wSite/productCompare/compare.jsp, Dec. 23, 2014, one page.
"Lightberry," https://web.archive.org/web/20131201194408/http:1/lightberry.eu/, Dec. 1, 2013, 11 pages.

* cited by examiner

STRAY LIGHT SUPPRESSION FOR HEAD WORN COMPUTING

CROSS REFERENCE TO RELATED APPLICATIONS

This application claims the benefit of priority to and is a continuation of the following U.S. patent applications, which is hereby incorporated by reference in its entirety:

U.S. non-provisional Ser. No. 18/770,487 entitled STRAY LIGHT SUPPRESSION FOR HEAD WORN COMPUTING, filed Jul. 11, 2024, which is a continuation of U.S. non-provisional Ser. No. 18/456,352 entitled STRAY LIGHT SUPPRESSION FOR HEAD WORN COMPUTING, filed Aug. 25, 2023, now U.S. Pat. No. 12,066,635, which is a continuation of U.S. non-provisional Ser. No. 16/775,866 entitled STRAY LIGHT SUPPRESSION FOR HEAD WORN COMPUTING, filed Jan. 29, 2020, now U.S. Pat. No. 11,782,274, which is a continuation of U.S. non-provisional Ser. No. 15/904,487 entitled STRAY LIGHT SUPPRESSION FOR HEAD WORN COMPUTING, filed Feb. 26, 2018, now U.S. Pat. No. 10,578,874, which is a continuation of U.S. non-provisional Ser. No. 14/811,258 entitled STRAY LIGHT SUPPRESSION FOR HEAD WORN COMPUTING, filed Jul. 28, 2015, now U.S. Pat. No. 9,939,646, which is a continuation of U.S. non-provisional application Ser. No. 14/185,987, entitled STRAY LIGHT SUPPRESSION FOR HEAD WORN COMPUTING, filed Feb. 21, 2014, now U.S. Pat. No. 9,122,054, which is a continuation of U.S. non-provisional application Ser. No. 14/163,646, entitled PERIPHERAL LIGHTING FOR HEAD WORN COMPUTING, filed Jan. 24, 2014, now U.S. Pat. No. 9,400,390.

BACKGROUND

Field of the Invention

This invention relates to head worn computing. More particularly, this invention relates to stray light suppression systems used in head worn computing.

Description of Related Art

Wearable computing systems have been developed and are beginning to be commercialized. Many problems persist in the wearable computing field that need to be resolved to make them meet the demands of the market.

SUMMARY

Aspects of the present invention relate to stray light control systems in head worn computing.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE DRAWINGS

Embodiments are described with reference to the following Figures. The same numbers may be used throughout to reference like features and components that are shown in the Figures:

FIG. 12*b* is an intensity vs wavelength chart showing the emissions of example red, green and blue quantum dots.

While the invention has been described in connection with certain preferred embodiments, other embodiments would be understood by one of ordinary skill in the art and are encompassed herein.

DETAILED DESCRIPTION OF THE PREFERRED EMBODIMENT(S)

Aspects of the present invention relate to head-worn computing ("HWC") systems. HWC involves, in some instances, a system that mimics the appearance of head-worn glasses or sunglasses. The glasses may be a fully developed computing platform, such as including computer displays presented in each of the lenses of the glasses to the eyes of the user. In embodiments, the lenses and displays may be configured to allow a person wearing the glasses to see the environment through the lenses while also seeing, simultaneously, digital imagery, which forms an overlaid image that is perceived by the person as a digitally augmented image of the environment, or augmented reality ("AR").

HWC involves more than just placing a computing system on a person's head. The system may need to be designed as a lightweight, compact and fully functional computer display, such as wherein the computer display includes a high resolution digital display that provides a high level of emersion comprised of the displayed digital content and the see-through view of the environmental surroundings. User interfaces and control systems suited to the HWC device may be required that are unlike those used for a more conventional computer such as a laptop. For the HWC and associated systems to be most effective, the glasses may be equipped with sensors to determine environmental conditions, geographic location, relative positioning to other points of interest, objects identified by imaging and movement by the user or other users in a connected group, and the like. The HWC may then change the mode of operation to match the conditions, location, positioning, movements, and the like, in a method generally referred to as a contextually aware HWC. The glasses also may need to be connected, wirelessly or otherwise, to other systems either locally or through a network. Controlling the glasses may be achieved through the use of an external device, automatically through contextually gathered information, through user gestures captured by the glasses sensors, and the like. Each technique may be further refined depending on the software application being used in the glasses. The glasses may further be used to control or coordinate with external devices that are associated with the glasses.

Figure 1:
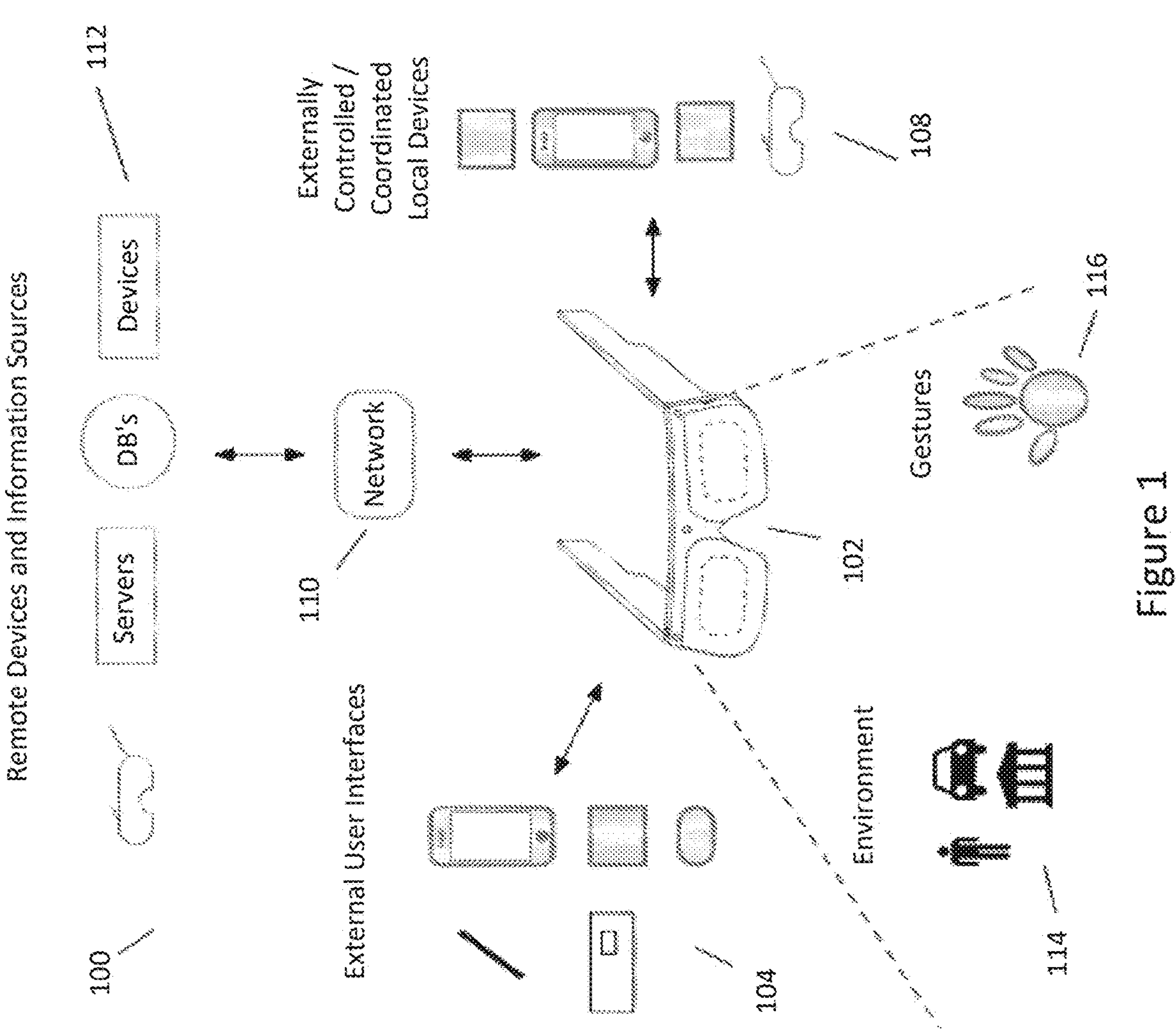
FIG. 1 illustrates a head worn computing system in accordance with the principles of the present invention.

Referring to FIG. 1, an overview of the HWC system 100 is presented. As shown, the HWC system 100 comprises a HWC 102, which in this instance is configured as glasses to be worn on the head with sensors such that the HWC 102 is aware of the objects and conditions in the environment 114. In this instance, the HWC 102 also receives and interprets control inputs such as gestures and movements 116. The HWC 102 may communicate with external user interfaces 104. The external user interfaces 104 may provide a physical user interface to take control instructions from a user of the HWC 102 and the external user interfaces 104 and the HWC 102 may communicate bi-directionally to affect the user's command and provide feedback to the external device 108. The HWC 102 may also communicate bi-directionally with externally controlled or coordinated local devices 108. For example, an external user interface 104 may be used in connection with the HWC 102 to control an externally controlled or coordinated local device 108. The externally controlled or coordinated local device 108 may provide feedback to the HWC 102 and a customized GUI may be presented in the HWC 102 based on the type of device or specifically identified device 108. The HWC 102 may also interact with remote devices and information sources 112 through a network connection 110. Again, the external user interface 104 may be used in connection with the HWC 102 to control or otherwise interact with any of the remote devices 108 and information sources 112 in a similar way as when the external user interfaces 104 are used to control or otherwise interact with the externally controlled or coordinated local devices 108. Similarly, HWC 102 may interpret gestures 116 (e.g. captured from forward, downward, upward, rearward facing sensors such as camera(s), range finders, IR sensors, etc.) or environmental conditions sensed in the environment 114 to control either local or remote devices 108 or 112.

We will now describe each of the main elements depicted on FIG. 1 in more detail; however, these descriptions are intended to provide general guidance and should not be construed as limiting. Additional description of each element may also be further described herein.

The HWC 102 is a computing platform intended to be worn on a person's head. The HWC 102 may take many different forms to fit many different functional requirements. In some situations, the HWC 102 will be designed in the form of conventional glasses. The glasses may or may not have active computer graphics displays. In situations where the HWC 102 has integrated computer displays the displays may be configured as see-through displays such that the digital imagery can be overlaid with respect to the user's view of the environment 114. There are a number of see-through optical designs that may be used, including ones that have a reflective display (e.g. LCOS, DLP), emissive displays (e.g. OLED, LED), hologram, TIR waveguides, and the like. In addition, the optical configuration may be monocular or binocular. It may also include vision corrective optical components. In embodiments, the optics may be packaged as contact lenses. In other embodiments, the HWC 102 may be in the form of a helmet with a see-through shield, sunglasses, safety glasses, goggles, a mask, fire helmet with see-through shield, police helmet with see-through shield, military helmet with see-through shield, utility form customized to a certain work task (e.g. inventory control, logistics, repair, maintenance, etc.), and the like.

The HWC 102 may also have a number of integrated computing facilities, such as an integrated processor, integrated power management, communication structures (e.g. cell net, WiFi, Bluetooth, local area connections, mesh connections, remote connections (e.g. client server, etc.)), and the like. The HWC 102 may also have a number of positional awareness sensors, such as GPS, electronic compass, altimeter, tilt sensor, IMU, and the like. It may also have other sensors such as a camera, rangefinder, hyper-spectral camera, Geiger counter, microphone, spectral illumination detector, temperature sensor, chemical sensor, biologic sensor, moisture sensor, ultrasonic sensor, and the like.

The HWC 102 may also have integrated control technologies. The integrated control technologies may be contextual based control, passive control, active control, user control, and the like. For example, the HWC 102 may have an integrated sensor (e.g. camera) that captures user hand or body gestures 116 such that the integrated processing system can interpret the gestures and generate control commands for the HWC 102. In another example, the HWC 102 may have sensors that detect movement (e.g. a nod, head shake, and the like) including accelerometers, gyros and other inertial measurements, where the integrated processor may interpret the movement and generate a control command in response. The HWC 102 may also automatically control itself based on measured or perceived environmental conditions. For example, if it is bright in the environment the HWC 102 may increase the brightness or contrast of the displayed image. In embodiments, the integrated control technologies may be mounted on the HWC 102 such that a user can interact with it directly. For example, the HWC 102 may have a button(s), touch capacitive interface, and the like.

As described herein, the HWC 102 may be in communication with external user interfaces 104. The external user interfaces may come in many different forms. For example, a cell phone screen may be adapted to take user input for control of an aspect of the HWC 102. The external user interface may be a dedicated UI, such as a keyboard, touch surface, button(s), joy stick, and the like. In embodiments, the external controller may be integrated into another device such as a ring, watch, bike, car, and the like. In each case, the external user interface 104 may include sensors (e.g. IMU, accelerometers, compass, altimeter, and the like) to provide additional input for controlling the HWD 104.

As described herein, the HWC 102 may control or coordinate with other local devices 108. The external devices 108 may be an audio device, visual device, vehicle, cell phone, computer, and the like. For instance, the local external device 108 may be another HWC 102, where information may then be exchanged between the separate HWCs 108.

Similar to the way the HWC 102 may control or coordinate with local devices 106, the HWC 102 may control or coordinate with remote devices 112, such as the HWC 102 communicating with the remote devices 112 through a network 110. Again, the form of the remote device 112 may have many forms. Included in these forms is another HWC 102. For example, each HWC 102 may communicate its GPS position such that all the HWCs 102 know where all of HWC 102 are located.

Figure 2:
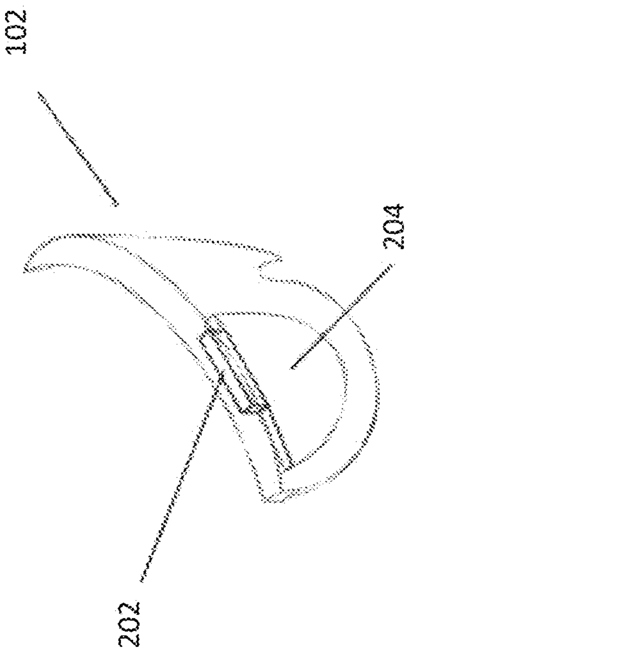
FIG. 2 illustrates a head worn computing system with optical system in accordance with the principles of the present invention.

FIG. 2 illustrates a HWC 102 with an optical system that includes an upper optical module 202 and a lower optical module 204. While the upper and lower optical modules 202 and 204 will generally be described as separate modules, it should be understood that this is illustrative only and the present invention includes other physical configurations, such as that when the two modules are combined into a single module or where the elements making up the two modules are configured into more than two modules. In embodiments, the upper module 202 includes a computer controlled display (e.g. LCOS, DLP, OLED, etc.) and image light delivery optics. In embodiments, the lower module includes eye delivery optics that are configured to receive the upper module's image light and deliver the image light to the eye of a wearer of the HWC. In FIG. 2, it should be noted that while the upper and lower optical modules 202 and 204 are illustrated in one side of the HWC such that image light can be delivered to one eye of the wearer, that it is envisioned by the present invention that embodiments will contain two image light delivery systems, one for each eye.

FIG. **3*b* illustrates an upper optical module 202 in accordance with the principles of the present invention. In this embodiment, the upper optical module 202 includes a DLP computer operated display 304 which includes pixels comprised of rotatable mirrors, polarized light source 302, ¼ wave retarder film 308, reflective polarizer 310 and a field lens 312. The polarized light source 302 provides substantially uniform light that is generally directed towards the reflective polarizer 310. The reflective polarizer reflects light of one polarization state (e.g. S polarized light) and transmits light of the other polarization state (e.g. P polarized light). The polarized light source 302 and the reflective polarizer 310 are oriented so that the polarized light from the polarized light source 302 reflected generally towards the DLP 304. The light then passes through the ¼ wave film 308 once before illuminating the pixels of the DLP 304 and then again after being reflected by the pixels of the DLP 304. In passing through the ¼ wave film 308 twice, the light is converted from one polarization state to the other polarization state (e.g. the light is converted from S to P polarized light). The light then passes through the reflective polarizer 310. In the event that the DLP pixel(s) are in the "on" state (i.e. the mirrors are positioned to reflect light back towards the field lens 312, the "on" pixels reflect the light generally along the optical axis and into the field lens 312. This light that is reflected by "on" pixels and which is directed generally along the optical axis of the field lens 312 will be referred to as image light 316. The image light 316 then passes through the field lens to be used by a lower optical module 204**.

Figure 3A:
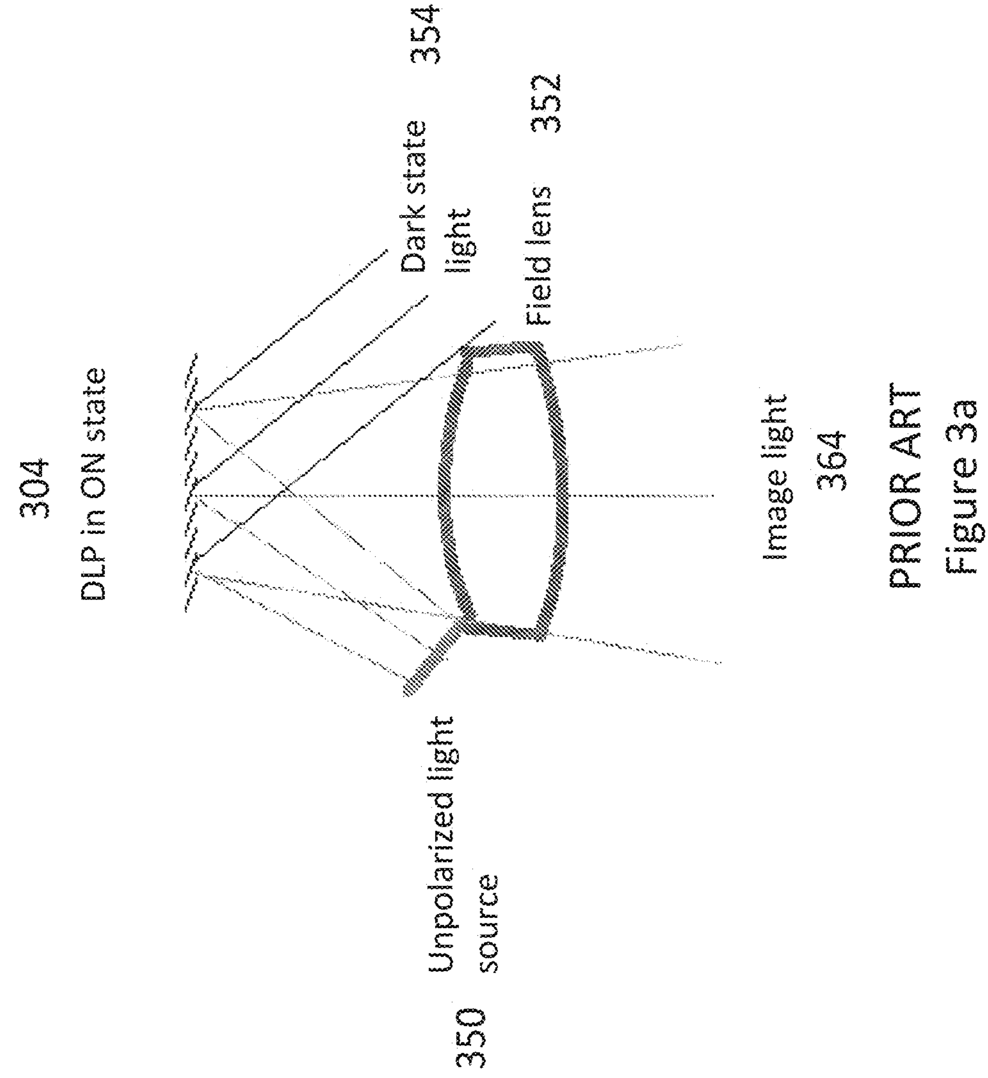
FIG. 3*a* illustrates a prior art upper optical module with a DLP image source.

The light that is provided by the polarized light source 302, which is subsequently reflected by the reflective polarizer 310 before it reflects from the DLP 304, will generally be referred to as illumination light. The light that is reflected by the "off" pixels of the DLP 304 is reflected at a different angle than the light reflected by the "on" pixels, so that the light from the "off" pixels is generally directed away from the optical axis of the field lens 312 and toward the side of the upper optical module 202 as shown in FIG. 3. The light that is reflected by the "off" pixels of the DLP 304 will be referred to as dark state light 314.

The DLP 304 operates as a computer controlled display and is generally thought of as a MEMs device. The DLP pixels are comprised of small mirrors that can be directed. The mirrors generally flip from one angle to another angle. The two angles are generally referred to as states. When light is used to illuminate the DLP the mirrors will reflect the light in a direction depending on the state. In embodiments herein, we generally refer to the two states as "on" and "off," which is intended to depict the condition of a display pixel. "On" pixels will be seen by a viewer of the display as emitting light because the light is directed along the optical axis and into the field lens and the associated remainder of the display system. "Off" pixels will be seen by a viewer of the display as not emitting light because the light from these pixels is directed to the side of the optical housing and into a light dump where the light is absorbed. The pattern of "on" and "off" pixels produces image light that is perceived by a viewer of the display as a computer generated image. Full color images can be presented to a user by sequentially providing illumination light with complimentary colors such as red, green and blue. Where the sequence is presented in a recurring cycle that is faster than the user can perceive as separate images and as a result the user perceives a full color image comprised of the sum of the sequential images. Bright pixels in the image are provided by pixels that remain in the "on" state for the entire time of the cycle, while dimmer pixels in the image are provided by pixels that switch between the "on" state and "off" state within the time of the cycle.

FIG. **3*a* shows an illustration of a system for a DLP 304 in which the unpolarized light source 350 is pointed directly at the DLP 304. In this case, the angle required for the illumination light is such that the field lens 352 must be positioned substantially distant from the DLP 304 to avoid the illumination light from being clipped by the field lens 352. The large distance between the field lens 352 and the DLP 304 along with the straight path of the dark state light 352, means that the light trap for the dark state light 352 is located at a substantial distance from the DLP. For these reasons, this configuration is larger in size compared to the upper optics module 202** of the preferred embodiments.

Figure 3B:
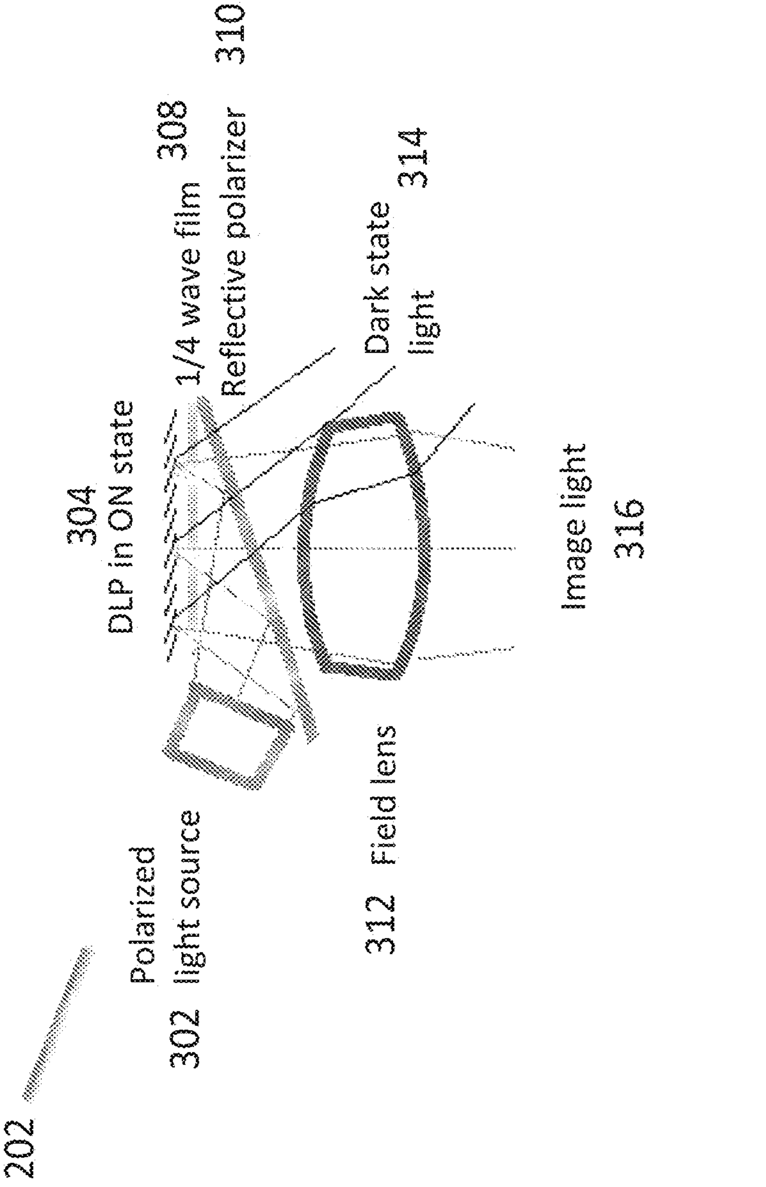
FIG. 3*b* illustrates an upper optical module that uses polarized light in accordance with the principles of the present invention.

The configuration illustrated in FIG. 3*b* can be lightweight and compact such that it fits into a portion of a HWC. For example, the upper modules 202 illustrated herein can be physically adapted to mount in an upper frame of a HWC such that the image light can be directed into a lower optical module 204 for presentation of digital content to a wearer's eye. The package of components that combine to generate the image light (i.e. the polarized light source 302, DLP 304, reflective polarizer 310 and ¼ wave film 308) is very light and is compact. The height of the system, excluding the field lens, may be less than 8 mm. The width (i.e. from front to back) may be less than 8 mm. The weight may be less than 2 grams. The compactness of this upper optical module 202 allows for a compact mechanical design of the HWC and the light weight nature of these embodiments help make the HWC lightweight to provide for a HWC that is comfortable for a wearer of the HWC.

The configuration illustrated in FIG. 3*b* can produce sharp contrast, high brightness and deep blacks, especially when compared to LCD or LCOS displays used in HWC. The "on" and "off" states of the DLP provide for a strong differentiator in the light reflection path representing an "on" pixel and an "off" pixel. As will be discussed in more detail below, the dark state light from the "off" pixel reflections can be managed to reduce stray light in the display system to produce images with high contrast.

Figure 4:
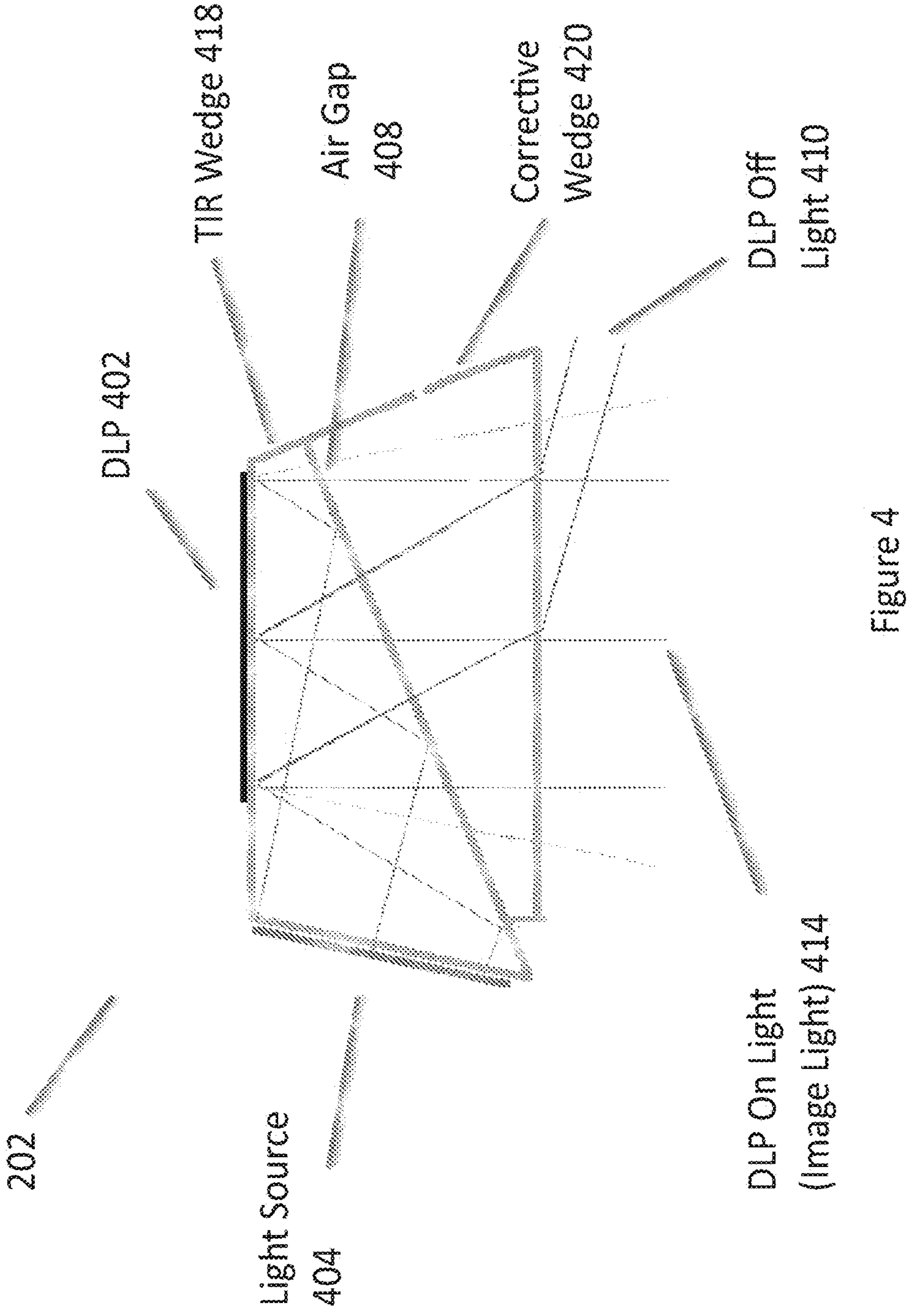
FIG. 4 illustrates an upper optical module in accordance with the principles of the present invention

FIG. 4 illustrates another embodiment of an upper optical module 202 in accordance with the principles of the present invention. This embodiment includes a light source 404, but in this case, the light source can provide unpolarized illumination light. The illumination light from the light source 404 is directed into a TIR wedge 418 such that the illumination light is incident on an internal surface of the TIR wedge 418 (shown as the angled lower surface of the TRI wedge 418 in FIG. 4) at an angle that is beyond the critical angle as defined by Eqn 1.

$$\text{Critical angle}=\text{arc-sin}(1/n) \qquad \text{Eqn 1}$$

Where the critical angle is the angle beyond which the illumination light is reflected from the internal surface when the internal surface comprises an interface from a solid with a higher refractive index to air with a refractive index of 1 (e.g. for an interface of acrylic, with a refractive index of 1.5, to air, the critical angle is 41.8 degrees; for an interface of polycarbonate, with a refractive index of 1.59, to air the critical angle is 38.9 degrees). Consequently, the TIR wedge 418 is associated with a thin air gap 408 along the internal surface to create an interface between a solid with a higher refractive index and air. By choosing the angle of the light source 404 relative to the DLP 402 in correspondence to the angle of the internal surface of the TIR wedge 418, illumination light is turned toward the DLP 402 at an angle suitable for providing image light as reflected from "on" pixels. Wherein, the illumination light is provided to the DLP 402 at approximately twice the angle of the pixel mirrors in the DLP 402 that are in the "on" state, such that after reflecting from the pixel mirrors, the image light is directed generally along the optical axis of the field lens. Depending on the state of the DLP pixels, the illumination light from "on" pixels may be reflected as image light 414 which is directed towards a field lens and a lower optical module 204, while illumination light reflected from "off" pixels (dark state light) is directed in a separate direction 410, which may be trapped and not used for the image that is ultimately presented to the wearer's eye.

The light trap may be located along the optical axis defined by the direction 410 and in the side of the housing, with the function of absorbing the dark state light. To this end, the light trap may be comprised of an area outside of the cone of image light from the "on" pixels. The light trap is typically made up of materials that absorb light including coatings of black paints or other light absorbing to prevent light scattering from the dark state light degrading the image perceived by the user. In addition, the light trap may be recessed into the wall of the housing or include masks or guards to block scattered light and prevent the light trap from being viewed adjacent to the displayed image.

The embodiment of FIG. 4 also includes a corrective wedge 420 to correct the effect of refraction of the image light 414 as it exits the TIR wedge 418. By including the corrective wedge 420 and providing a thin air gap 408 (e.g. 25 micron), the image light from the "on" pixels can be maintained generally in a direction along the optical axis of the field lens so it passes into the field lens and the lower optical module 204. As shown in FIG. 4, the image light from the "on" pixels exits the corrective wedge 420 generally perpendicular to the surface of the corrective wedge 420 while the dark state light exits at an oblique angle. As a result, the direction of the image light from the "on" pixels is largely unaffected by refraction as it exits from the surface of the corrective wedge 420. In contrast, the dark state light is substantially changed in direction by refraction when the dark state light exits the corrective wedge 420.

Figure 4A:
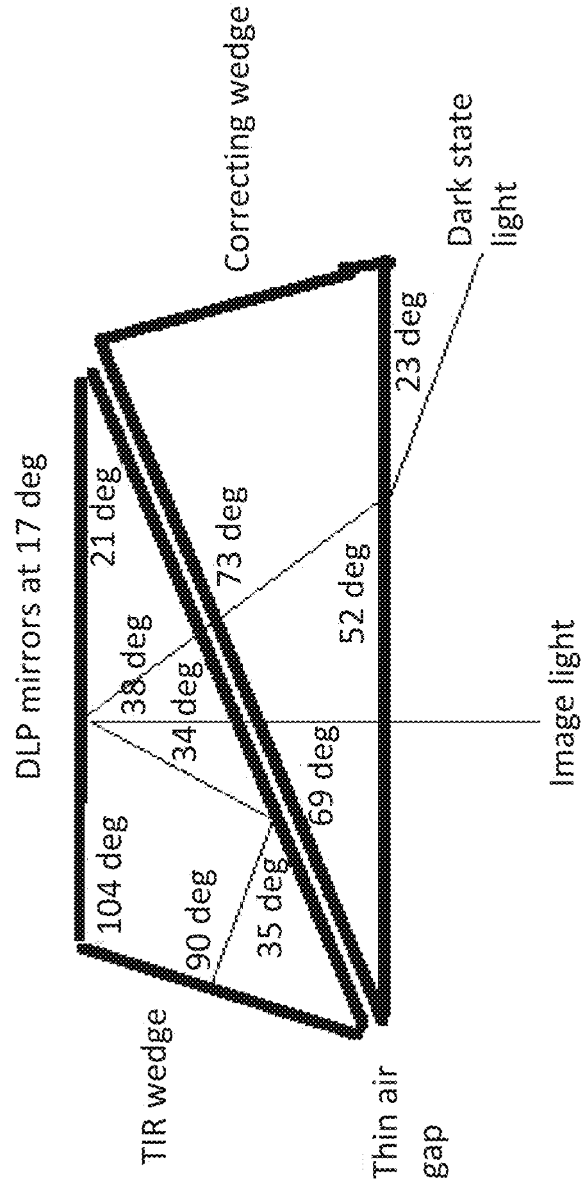
FIG. 4*a* illustrates an example geometry of a TIR wedge and a correcting wedge in an upper optical module in accordance with principles of the present invention.

The embodiment illustrated in FIG. 4 has the similar advantages of those discussed in connection with the embodiment of FIG. 3*b*. The dimensions and weight of the upper module 202 depicted in FIG. 4 may be approximately 8×8 mm with a weight of less than 3 grams. A difference in overall performance between the configuration illustrated in FIG. 3*b* and the configuration illustrated in FIG. 4 is that the embodiment of FIG. 4 doesn't require the use of polarized light as supplied by the light source 404. This can be an advantage in some situations as will be discussed in more detail below (e.g. increased see-through transparency of the HWC optics from the user's perspective). An additional advantage of the embodiment of FIG. 4 compared to the embodiment shown in FIG. 3*b* is that the dark state light (shown as DLP off light 410) is directed at a steeper angle away from the optical axis due to the added refraction encountered when the dark state light exits the corrective wedge 420. This steeper angle of the dark state light allows for the light trap to be positioned closer to the DLP 402 so that the overall size of the upper module 202 can be reduced. The light trap can also be made larger since the light trap doesn't interfere with the field lens, thereby the efficiency of the light trap can be increased and as a result, stray light can be reduced and the contrast of the image perceived by the user can be increased. FIG. 4*a* provides a further illustration of example geometry associated with the light source, 404 the TIR wedge 418 and associated thin air gap, and the corrective wedge 420 such that light from the light source is reflected toward the DLP 402 and the image light 414 is transmitted in a direction along the optical axis for the field lens.

Figure 5:
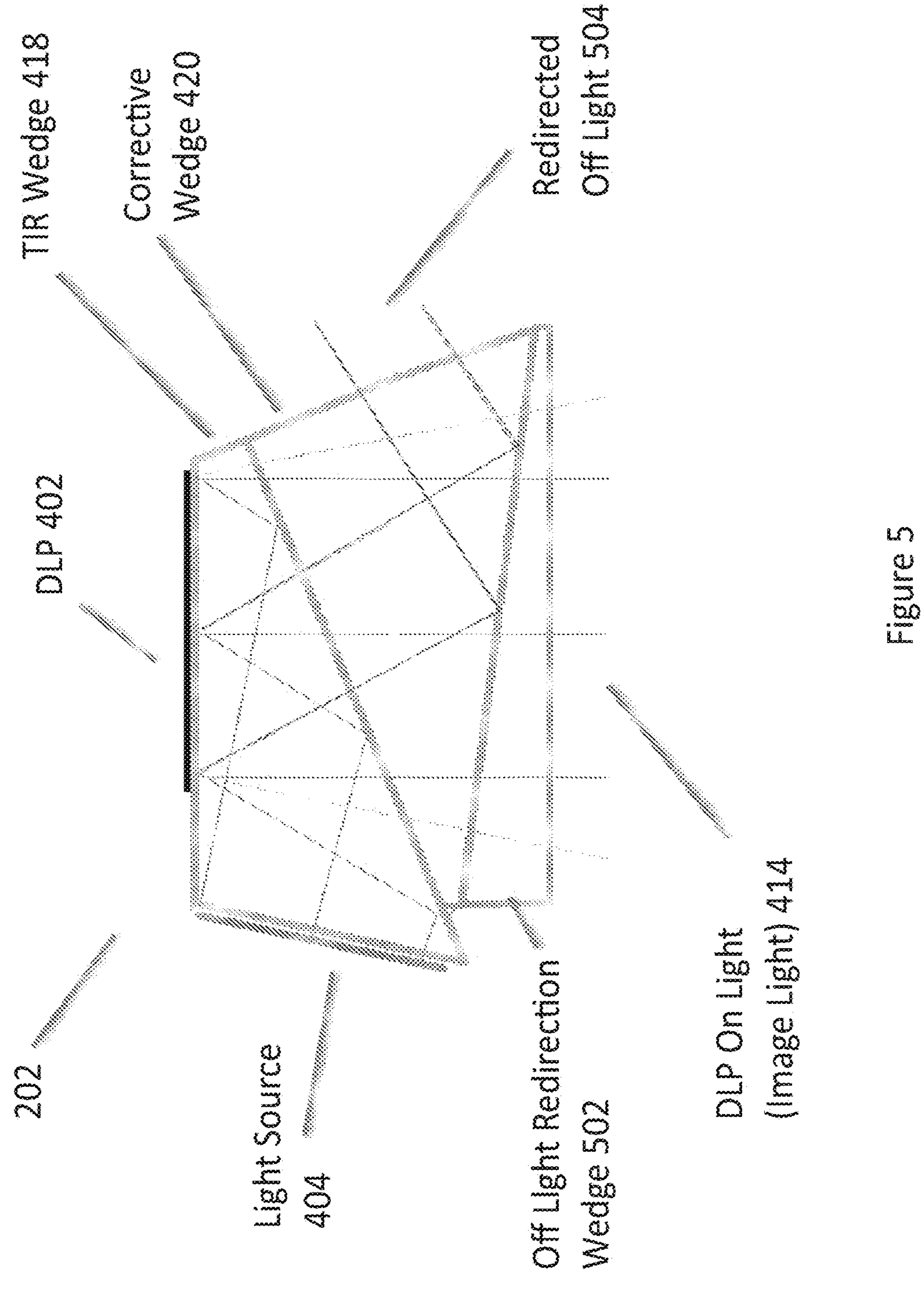
FIG. 5 illustrates an upper optical module in accordance with the principles of the present invention.
Figure 5A:
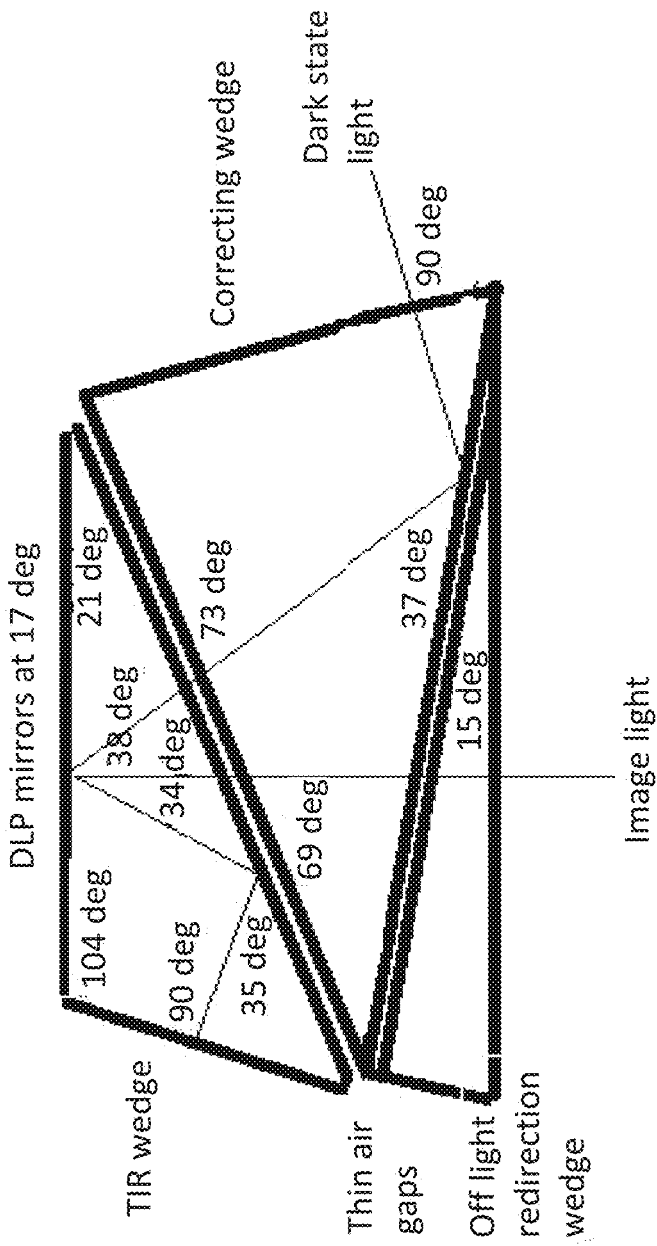
FIG. 5*a* illustrates an example geometry of a TIR wedge, a correct wedge, and an off light redirection wedge in an upper optical module in accordance with principles of the present invention.

FIG. 5 illustrates yet another embodiment of an upper optical module 202 in accordance with the principles of the present invention. As with the embodiment shown in FIG. 4, the embodiment shown in FIG. 5 does not require the use of polarized light. The optical module 202 depicted in FIG. 5 is similar to that presented in connection with FIG. 4; however, the embodiment of FIG. 5 includes an off light redirection wedge 502 with an associated thin air gap. As can be seen from the illustration, the off light redirection wedge 502 allows the image light 414 to continue generally along the optical axis toward the field lens and into the lower optical module 204 (as illustrated). However, the off light 504 is incident at the interface to the off light redirection wedge 502 and associated thin air gap at an angle that is beyond the critical angle (see Eqn 1) so that the off light 504 is reflected and is redirected substantially toward the side of the corrective wedge 420 where it passes into the light trap. This configuration may allow further height compactness in the HWC because the light trap (not illustrated) that is intended to absorb the off light 504 can be positioned laterally adjacent the upper optical module 202 as opposed to below it. There may be HWC mechanical configurations that warrant the positioning of a light trap for the dark state light elsewhere and the illustration depicted in FIG. 5 should be considered illustrative of the concept that the off light can be redirected to create compactness of the overall HWC. FIG. 5*a* provides a further illustration of example geometry associated with the light source 404, the TIR wedge 418 and associated thin air gap, the corrective wedge 420 and associated thin air gap and the off light redirection wedge 502 such that the off light is reflected to the side by TIR conditions at the interface between the corrective wedge 420 and the off light redirection wedge 502. The image light 414 is transmitted through the interfaces between the TIR wedge 418, the corrective wedge 420 and the off light redirection wedge 502 so that it exits in a direction along the optical axis of the field lens.

Figure 6:
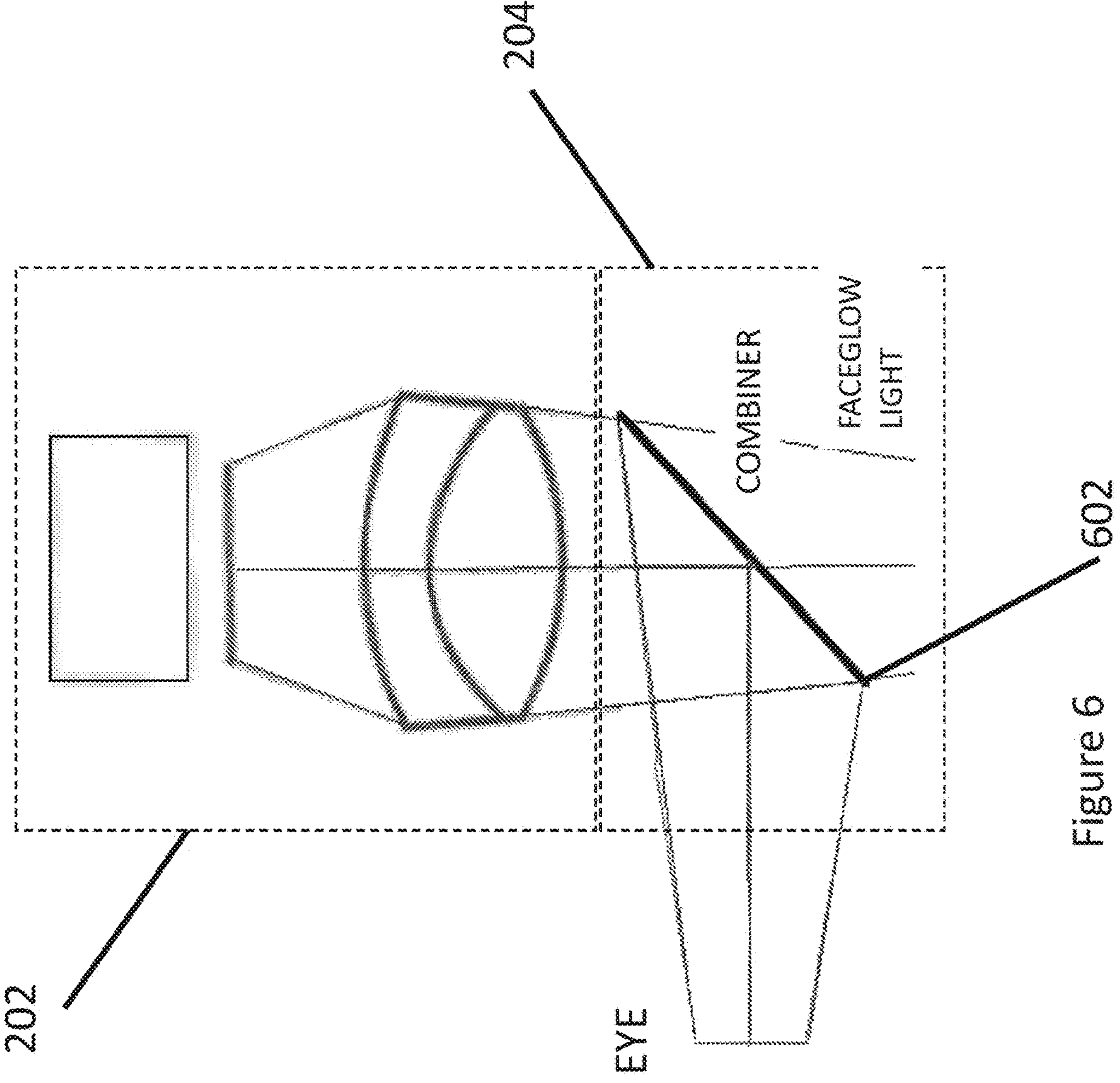
FIG. 6 illustrates upper and lower optical modules in accordance with the principles of the present invention.

FIG. 6 illustrates a combination of an upper optical module 202 with a lower optical module 204. In this embodiment, the image light projected from the upper optical module 202 may or may not be polarized. The image light is reflected off a flat combiner element 602 such that it is directed towards the user's eye. Wherein, the combiner element 602 is a partial mirror that reflects image light while transmitting a substantial portion of light from the environment so the user can look through the combiner element and see the environment surrounding the HWC.

The combiner 602 may include a holographic pattern, to form a holographic mirror. If a monochrome image is desired, there may be a single wavelength reflection design for the holographic pattern on the surface of the combiner 602. If the intention is to have multiple colors reflected from the surface of the combiner 602, a multiple wavelength holographic mirror may be included on the combiner surface. For example, in a three color embodiment, where red, green and blue pixels are generated in the image light, the holographic mirror may be reflective to wavelengths matching the wavelengths of the red, green and blue light provided by the light source. This configuration can be used as a wavelength specific mirror where pre-determined wavelengths of light from the image light are reflected to the user's eye. This configuration may also be made such that substantially all other wavelengths in the visible pass through the combiner element 602 so the user has a substantially clear view of the surroundings when looking through the combiner element 602. The transparency between the user's eye and the surrounding may be approximately 80% when using a combiner that is a holographic mirror. Wherein holographic mirrors can be made using lasers to produce interference patterns in the holographic material of the combiner where the wavelengths of the lasers correspond to the wavelengths of light that are subsequently reflected by the holographic mirror.

In another embodiment, the combiner element 602 may include a notch mirror comprised of a multilayer coated substrate wherein the coating is designed to substantially reflect the wavelengths of light provided by the light source and substantially transmit the remaining wavelengths in the visible spectrum. For example, in the case where red, green and blue light is provided by the light source to enable full color images to be provided to the user, the notch mirror is a tristimulus notch mirror wherein the multilayer coating is designed to reflect narrow bands of red, green and blue light that are matched to the what is provided by the light source and the remaining visible wavelengths are transmitted to enable a view of the environment through the combiner. In another example where monochrome images are provided to the user, the notch mirror is designed to reflect a narrow band of light that is matched to the wavelengths of light provided by the light source while transmitting the remaining visible wavelengths to enable a see-through view of the environment. The combiner 602 with the notch mirror would operate, from the user's perspective, in a manner similar to the combiner that includes a holographic pattern on the combiner element 602. The combiner, with the tristimulus notch mirror, would reflect the "on" pixels to the eye because of the match between the reflective wavelengths of the notch mirror and the color of the image light, and the wearer would be able to see with high clarity the surroundings. The transparency between the user's eye and the surrounding may be approximately 80% when using the tristimulus notch mirror. In addition, the image provided by the upper optical module 202 with the notch mirror combiner can provide higher contrast images than the holographic mirror combiner due to less scattering of the imaging light by the combiner.

Figure 7:
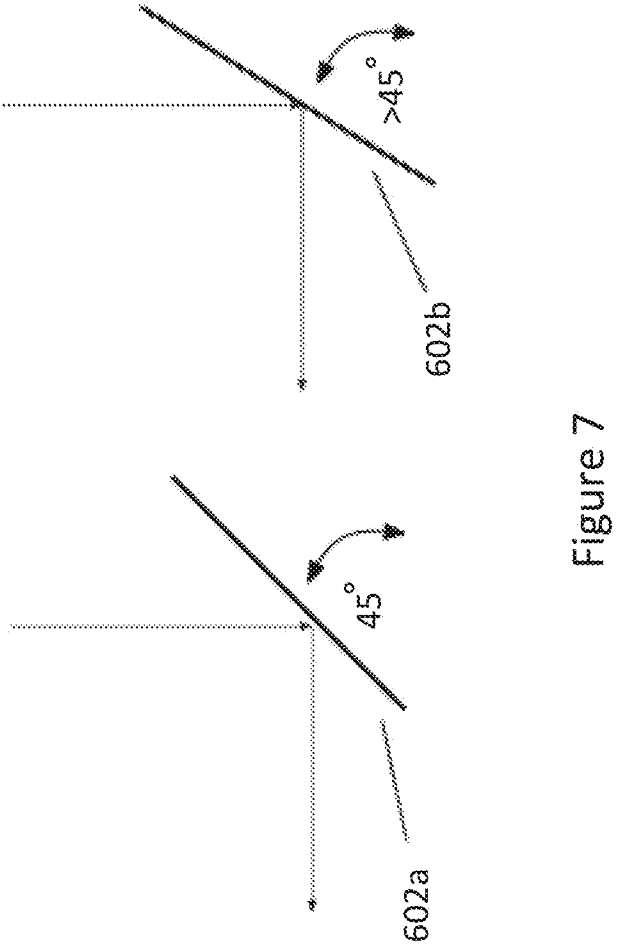
FIG. 7 illustrates angles of combiner elements in accordance with the principles of the present invention.

FIG. 7 illustrates an embodiment of a combiner element 602 at various angles when the combiner element 602 includes a holographic mirror. Normally, a mirrored surface reflects light at an angle equal to the angle that the light is incident to the mirrored surface. Typically this necessitates that the combiner element be at 45 degrees, 602*a*, if the light is presented vertically to the combiner so the light can be reflected horizontally towards the wearer's eye. In embodiments, the incident light can be presented at angles other than vertical to enable the mirror surface to be oriented at other than 45 degrees, but in all cases wherein a mirrored surface is employed, the incident angle equals the reflected angle. As a result, increasing the angle of the combiner 602*a* requires that the incident image light be presented to the combiner 602*a* at a different angle which positions the upper optical module 202 to the left of the combiner as shown in FIG. 7. In contrast, a holographic mirror combiner, included in embodiments, can be made such that light is reflected at a different angle from the angle that the light is incident onto the holographic mirrored surface. This allows freedom to select the angle of the combiner element 602*b* independent of the angle of the incident image light and the angle of the light reflected into the wearer's eye. In embodiments, the angle of the combiner element 602*b* is greater than 45 degrees (shown in FIG. 7) as this allows a more laterally compact HWC design. The increased angle of the combiner element 602*b* decreases the front to back width of the lower optical module 204 and may allow for a thinner HWC display (i.e. the furthest element from the wearer's eye can be closer to the wearer's face).

Light can escape through the combiner 602 and may produce face glow as the light is generally directed downward onto the cheek of the user. When using a holographic mirror combiner or a tristimulus notch mirror combiner, the escaping light can be trapped to avoid face glow. In embodiments, if the image light is polarized before the combiner 602, a linear polarizer can be laminated, or otherwise associated, to the combiner 602 (for example, the polarizer can be laminated to the side of the combiner that is away from the user's eye), with the transmission axis of the polarizer oriented relative to the polarized image light so that any escaping image light is absorbed by the polarizer. In embodiments, the image light would be polarized to provide S polarized light to the combiner 602 for better reflection. As a result, the linear polarizer on the combiner 602 would be oriented to absorb S polarized light and pass P polarized light. This provides the preferred orientation of polarized sunglasses as well as this orientation will absorb light reflected from the surface of lakes and ponds. In a preferred embodiment, the polarizer is combined with a tristimulus notch mirror combiner.

If the image light is unpolarized, a microlouvered film such as a privacy filter (for example 3M ALCF: http://products3.3m.com/catalog/us/en001/electronics_mfg/vikuiti/node_PSG4KNNLC2be/root_GST1T4S9TCgv/vroot_S6Q2FD9X0Jge/gvel_ZF5G3RNK7BgI/theme_us_vikuiti_3_0/command_AbcPageHandler/output_html) can be used to absorb the escaping image light while providing the user with a see-through view of the environment. In this case, the absorbance or transmittance of the microlouvered film is dependent on the angle of the light, Where steep angle light is absorbed by the microlouvered film and light at less of an angle is transmitted by the microlouvered film. For this reason, in an embodiment, the combiner 602 with the microlouver film is angled at greater than 45 degrees, as shown in FIG. 7 as combiner 602*b*, to the optical axis of the image light presented to the user's eye (e.g. the combiner can be oriented at 50 degrees so the image light from the field lens is incident on the combiner at 40 degrees for example. Where the combiner and the lower optical module 204 are oriented such that light for the see-thru view passes through the combiner at an angle that is closer to normal incidence that the angle that the image light is incident upon the combiner. In a preferred embodiment, the microlouvered film is combined with a holographic mirror combiner.

Figure 8:
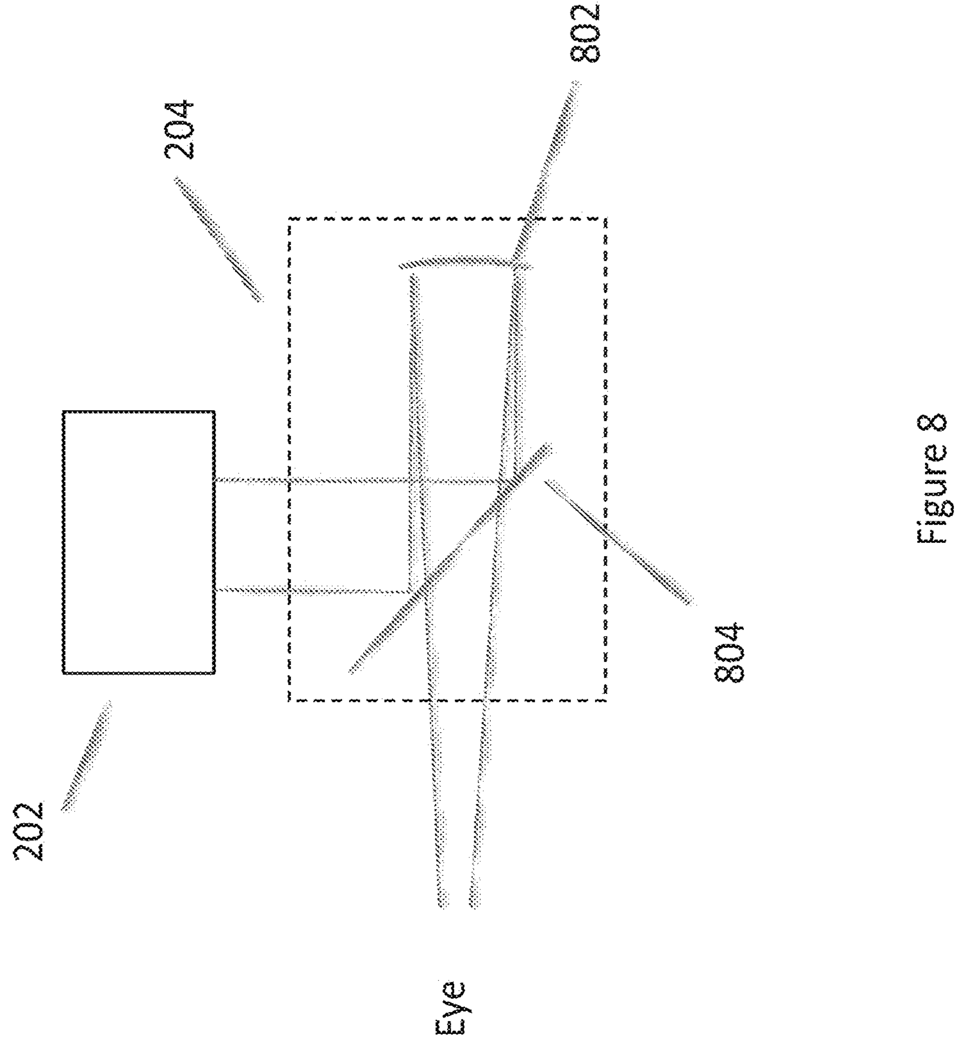
FIG. 8 illustrates upper and lower optical modules in accordance with the principles of the present invention.

FIG. 8 illustrates another embodiment of a lower optical module 204. In this embodiment, polarized image light provided by the upper optical module 202, is directed into the lower optical module 204. The image light reflects off a polarized mirror 804 and is directed to a focusing partially reflective mirror 802, which is adapted to reflect the polarized light. An optical element such as a ¼ wave film located between the polarized mirror 804 and the partially reflective mirror 802, is used to change the polarization state of the image light such that the light reflected by the partially reflective mirror 802 is transmitted by the polarized mirror 804 to present image light to the eye of the wearer. The user can also see through the polarized mirror 804 and the partially reflective mirror 802 to see the surrounding environment. As a result, the user perceives a combined image comprised of the displayed image light overlaid onto the see-through view of the environment.

Another aspect of the present invention relates to eye imaging. In embodiments, a camera is used in connection with an upper optical module 202 such that the wearer's eye can be imaged using pixels in the "off" state on the DLP.

Figure 9:
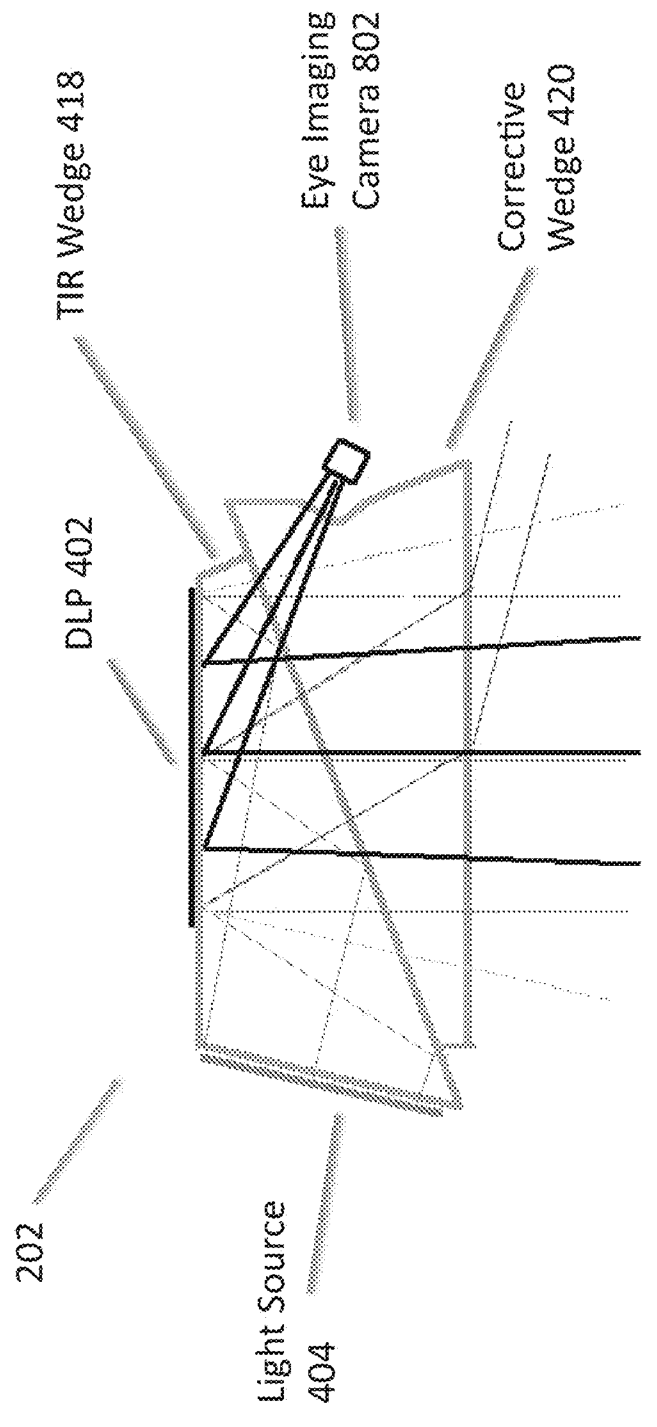
FIG. 9 illustrates an eye imaging system in accordance with the principles of the present invention.

FIG. 9 illustrates a system where the eye imaging camera 802 is mounted and angled such that the field of view of the eye imaging camera 802 is redirected toward the wearer's eye by the mirror pixels of the DLP 402 that are in the "off" state. In this way, the eye imaging camera 802 can be used to image the wearer's eye along the same optical axis as the displayed image that is presented to the wearer. Wherein, image light that is presented to the wearer's eye illuminates the wearer's eye so that the eye can be imaged by the eye imaging camera 802. In the process, the light reflected by the eye passes back through the optical train of the lower optical module 204 and a portion of the upper optical module to where the light is reflected by the "off" pixels of the DLP 402 toward the eye imaging camera 802.

In embodiments, the eye imaging camera may image the wearer's eye at a moment in time where there are enough "off" pixels to achieve the required eye image resolution. In another embodiment, the eye imaging camera collects eye image information from "off" pixels over time and forms a time lapsed image. In another embodiment, a modified image is presented to the user wherein enough "off" state pixels are included that the camera can obtain the desired resolution and brightness for imaging the wearer's eye and the eye image capture is synchronized with the presentation of the modified image.

The eye imaging system may be used for security systems. The HWC may not allow access to the HWC or other system if the eye is not recognized (e.g. through eye characteristics including retina or iris characteristics, etc.). The HWC may be used to provide constant security access in some embodiments. For example, the eye security confirmation may be a continuous, near-continuous, real-time, quasi real-time, periodic, etc. process so the wearer is effectively constantly being verified as known. In embodiments, the HWC may be worn and eye security tracked for access to other computer systems.

The eye imaging system may be used for control of the HWC. For example, a blink, wink, or particular eye movement may be used as a control mechanism for a software application operating on the HWC or associated device.

The eye imaging system may be used in a process that determines how or when the HWC 102 delivers digitally displayed content to the wearer. For example, the eye imaging system may determine that the user is looking in a direction and then HWC may change the resolution in an area of the display or provide some content that is associated with something in the environment that the user may be looking at. Alternatively, the eye imaging system may identify different users and change the displayed content or enabled features provided to the user. Users may be identified from a database of user's eye characteristics either located on the HWC 102 or remotely located on the network 110 or on a server 112. In addition, the HWC may identify a primary user or a group of primary users from eye characteristics wherein the primary user(s) are provided with an enhanced set of features and all other users are provided with a different set of features. Thus in this use case, the HWC 102 uses identified eye characteristics to either enable features or not and eye characteristics need only be analyzed in comparison to a relatively small database of individual eye characteristics.

Figure 10:
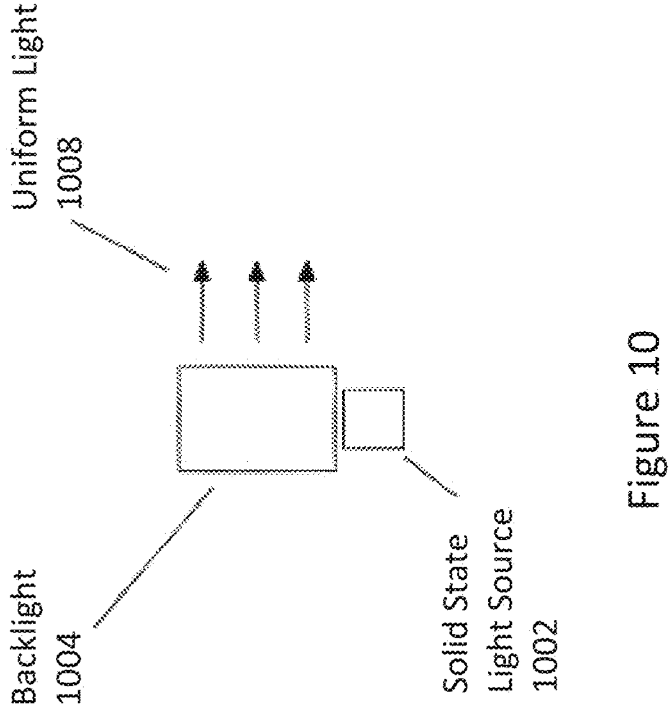
FIG. 10 illustrates a light source in accordance with the principles of the present invention.

FIG. 10 illustrates a light source that may be used in association with the upper optics module 202 (e.g. polarized light source if the light from the solid state light source is polarized), and light source 404. In embodiments, to provide a uniform surface of light 1008 to be directed towards the DLP of the upper optical module, either directly or indirectly, the solid state light source 1002 may be projected into a backlighting optical system 1004. The solid state light source 1002 may be one or more LEDs, laser diodes, OLEDs. In embodiments, the backlighting optical system 1004 includes an extended section with a length/distance ratio of greater than 3, wherein the light undergoes multiple reflections from the sidewalls to mix of homogenize the light as supplied by the solid state light source 1002. The backlighting optical system 1004 also includes structures on the surface opposite (on the left side as shown in FIG. 10) to where the uniform light 1008 exits the backlight 1004 to change the direction of the light toward the DLP 302 and the reflective polarizer 310 or the DLP 402 and the TIR wedge 418. The backlighting optical system 1004 may also include structures to collimate the uniform light 1008 to provide light to the DLP with a smaller angular distribution or narrower cone angle. Diffusers including elliptical diffusers can be used on the entrance or exit surfaces of the backlighting optical system to improve the uniformity of the uniform light 1008 in directions orthogonal to the optical axis of the uniform light 1008.

Figures 10A, 10B:
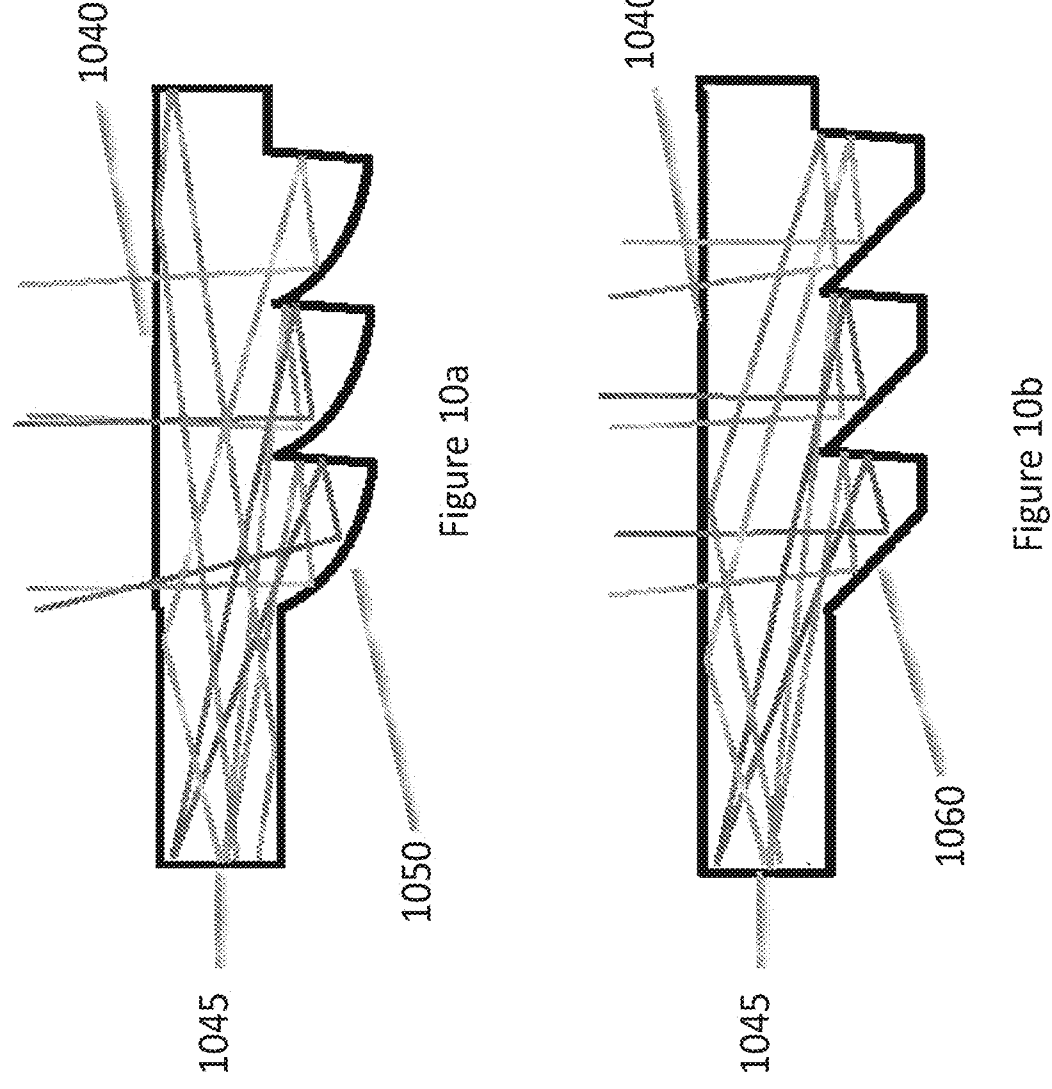
FIG. 10*a* illustrates a structure in a backlight for redirecting and collimating light provided by the backlight to an upper optical module in accordance with principles of the present invention.
FIG. 10*b* illustrates another structure in a backlight for redirecting and collimating light provided by the backlight to an upper optical module in accordance with principles of the present invention.

FIGS. 10*a* and 10*b* show illustrations of structures in backlight optical systems 1004 that can be used to change the direction of the light provided to the entrance face 1045 by the light source and then collimates the light in a direction lateral to the optical axis of the exiting uniform light 1008. Structure 1060 includes an angled sawtooth pattern wherein the left edge of each sawtooth clips the steep angle rays of light thereby limiting the angle of the light being redirected. The steep surface at the right (as shown) of each sawtooth then redirects the light so that it reflects off the left angled surface of each sawtooth and is directed toward the exit surface 1040. Structure 1050 includes a curved face on the left side (as shown) to focus the rays after they pass through the exit surface 1040, thereby providing a mechanism for collimating the uniform light 1008.

Figure 11A:
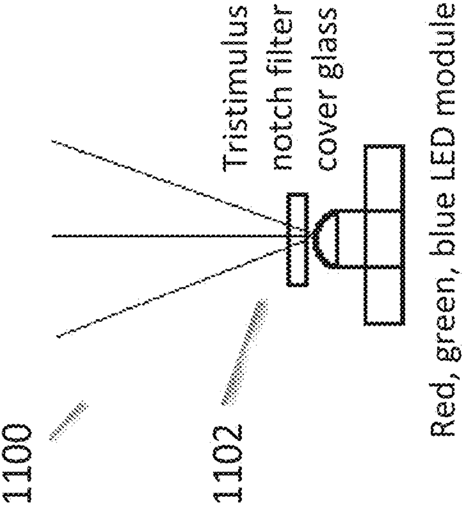
FIG. 11*a* illustrates a narrow band light source in accordance with the principles of the present invention.
Figure 11B:
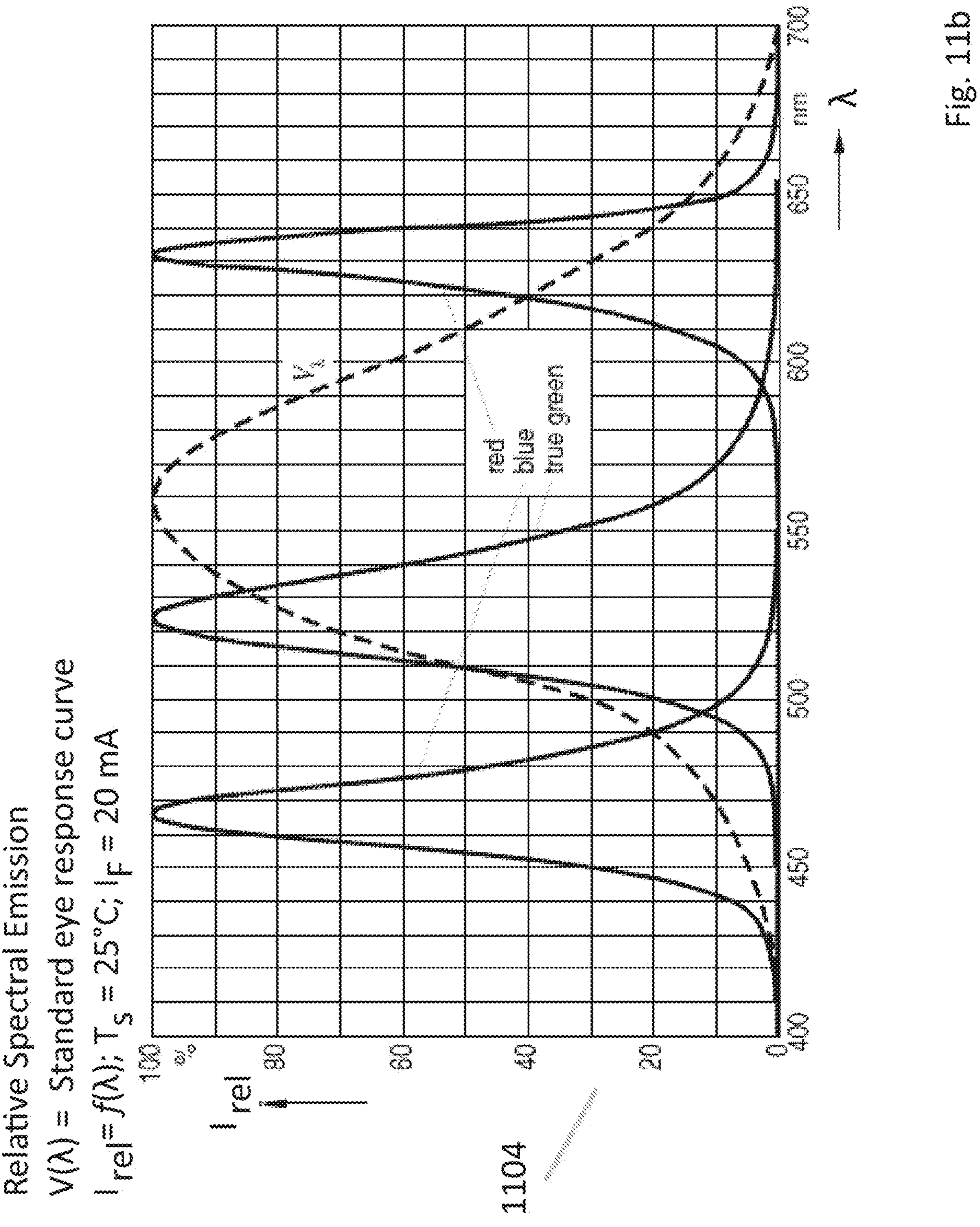
FIG. 11*b* is a spectral graph for light provided by example red, green and blue LEDs.
Figure 11C:
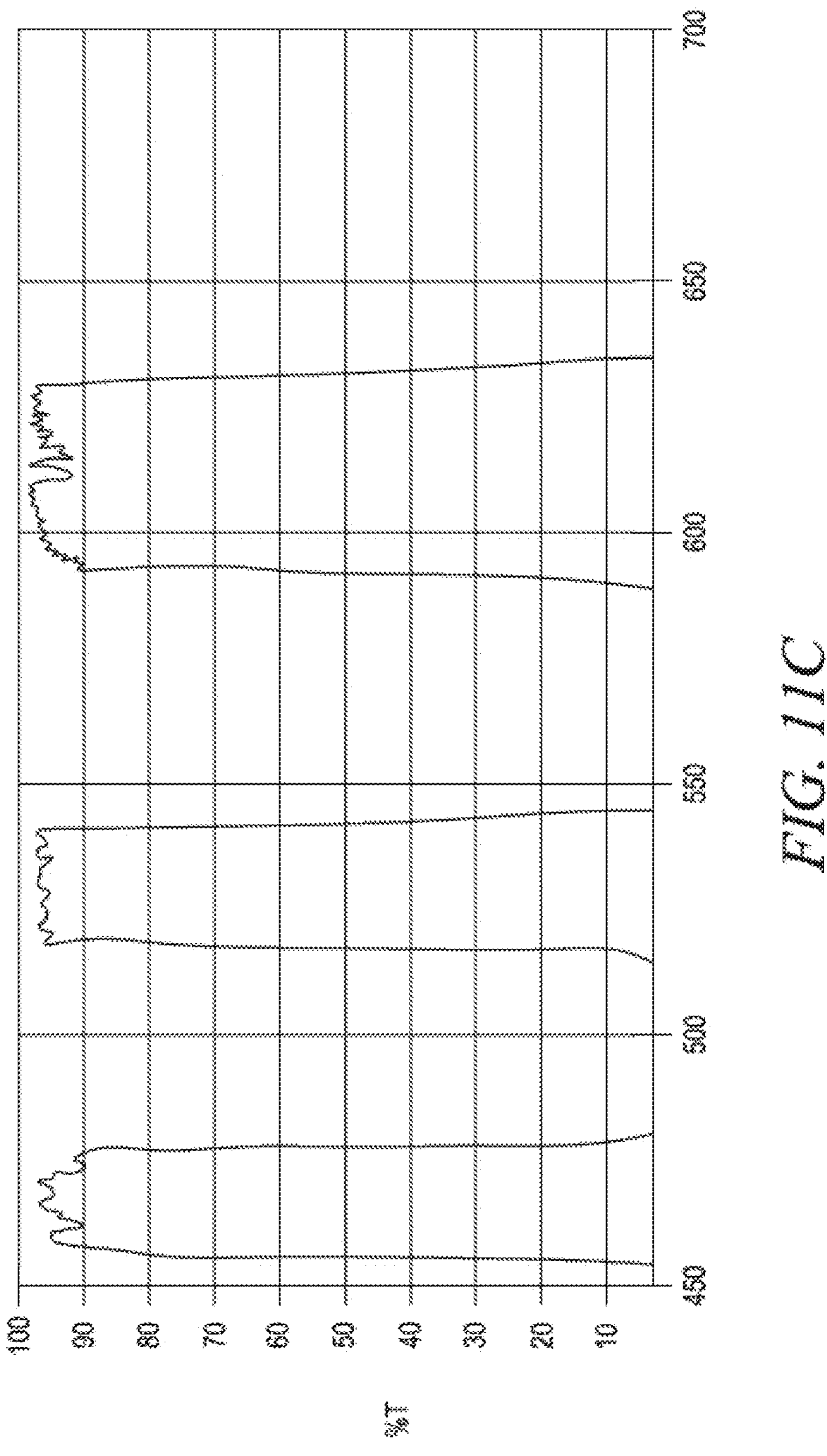
FIG. 11*c* is a transmission graph for an example tristimulus notch filter included in the narrow band light source in accordance with principles of the present invention.
Figure 11D:
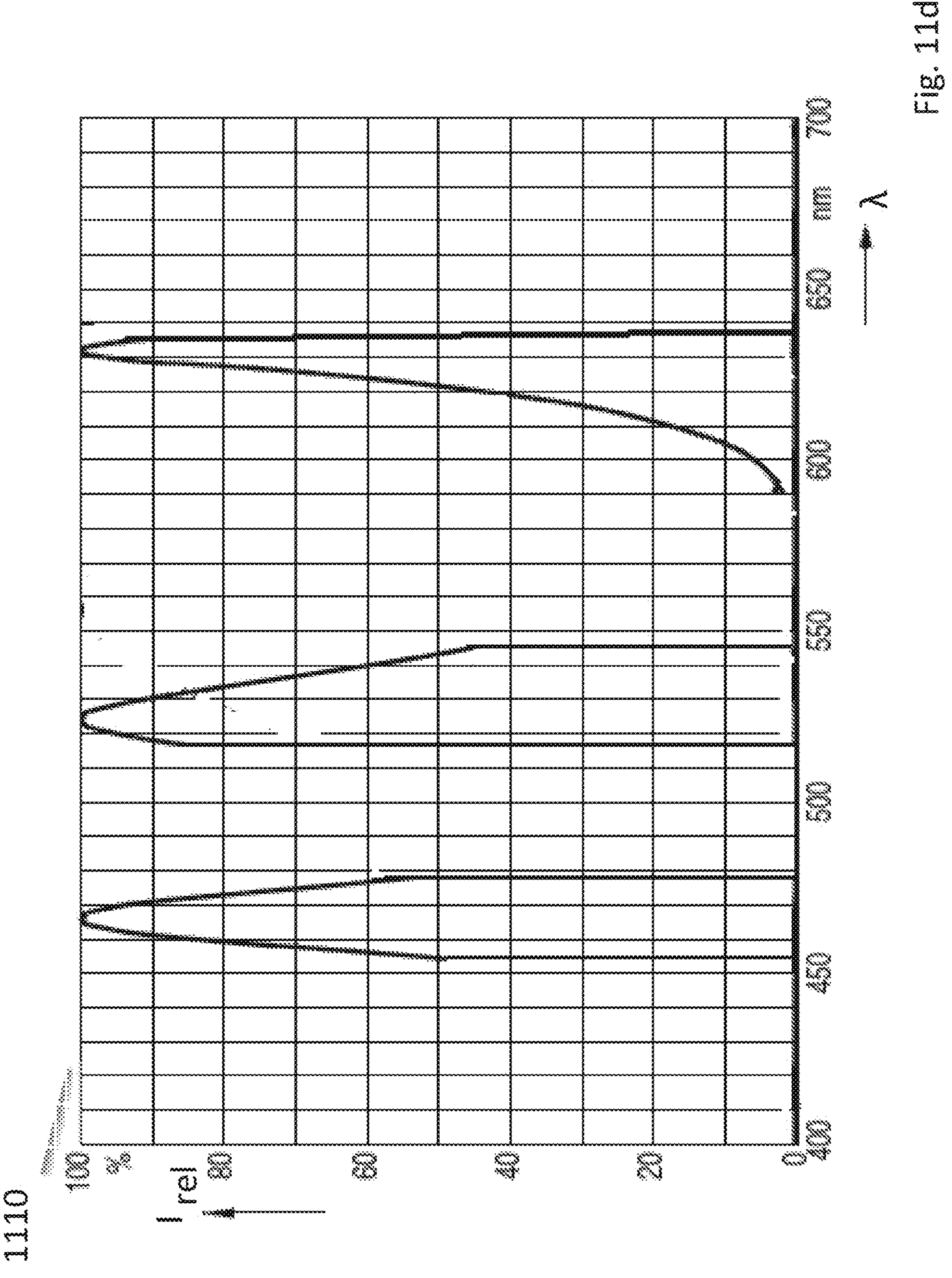
FIG. 11*d* is a spectral graph of the narrow bands of light provided by the light source of FIG. 11*a* in accordance with principles of the present invention.

FIG. 11*a* illustrates a light source 1100 that may be used in association with the upper optics module 202. In embodiments, the light source 1100 may provide light to a backlighting optical system 1004 as described above in connection with FIG. 10. In embodiments, the light source 1100 includes a tristimulus notch filter 1102. The tristimulus notch filter 1102 has narrow band pass filters for three wavelengths, as indicated in FIG. 11*c* in a transmission graph 1108. The graph shown in FIG. 11*b*, as 1104 illustrates an output of three different colored LEDs. One can see that the bandwidths of emission are narrow, but they have long tails. The tristimulus notch filter 1102 can be used in connection with such LEDs to provide a light source 1100 that emits narrow filtered wavelengths of light as shown in FIG. 11*d* as the transmission graph 1110. Wherein the clipping effects of the tristimulus notch filter 1102 can be seen to have cut the tails from the LED emission graph 1104 to provide narrower wavelength bands of light to the upper optical module 202. The light source 1100 can be used in connection with a combiner 602 with a holographic mirror or tristimulus notch mirror to provide narrow bands of light that are reflected toward the wearer's eye with less waste light that does not get reflected by the combiner, thereby improving efficiency and reducing escaping light that can cause faceglow.

Figure 12:
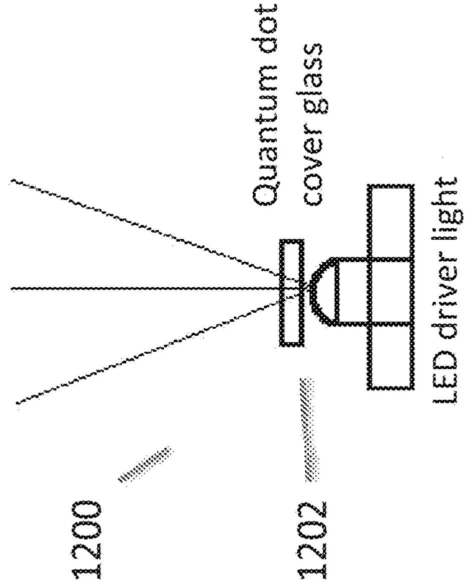
FIG. 12 illustrates a light source in accordance with the principles of the present invention.
Figure 12A:
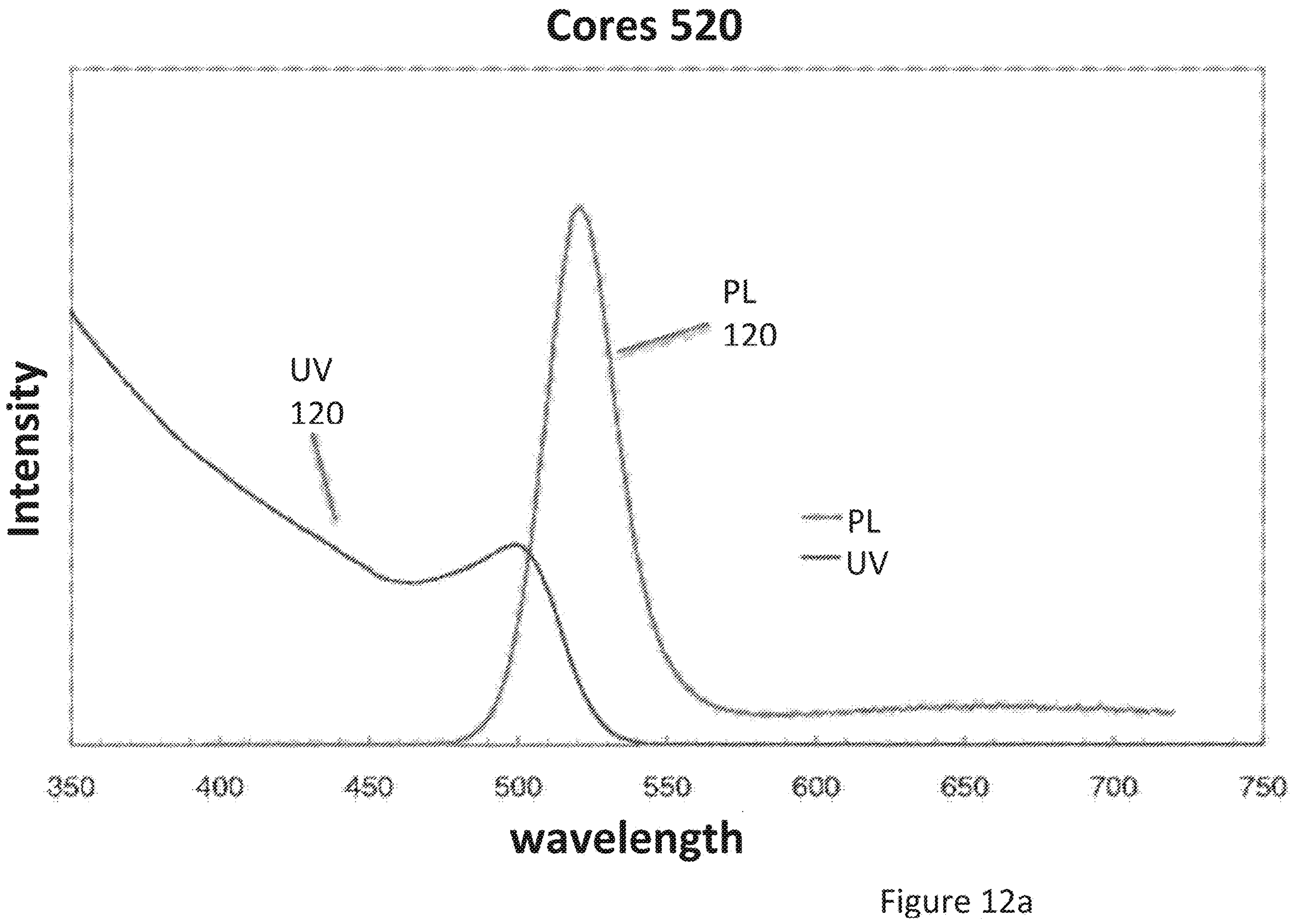
FIG. 12*a* is an intensity vs wavelength chart showing the effect of UV illumination on an example quantum dot.
Figure 12:
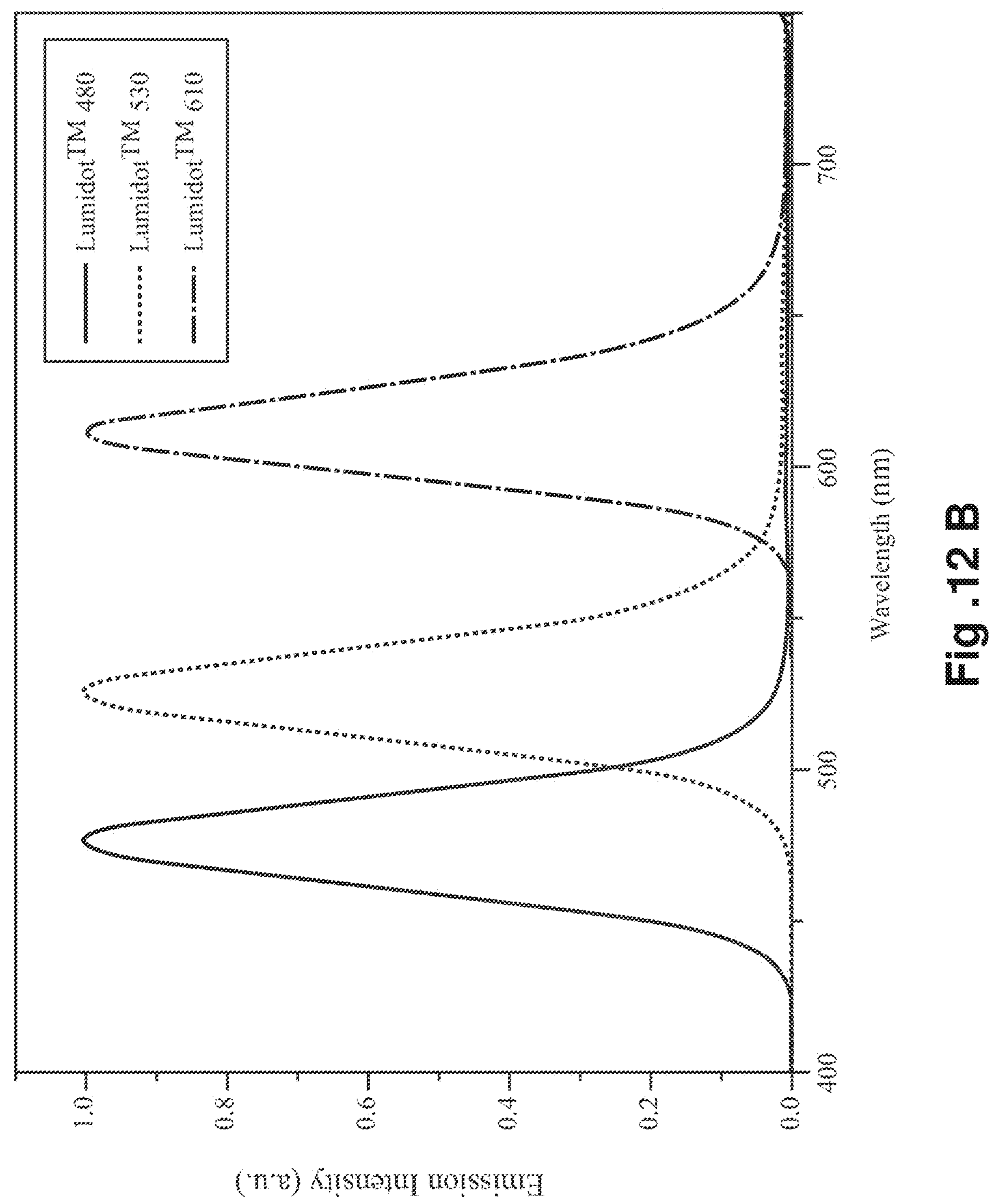

FIG. 12 illustrates another light source 1200 that may be used in association with the upper optics module 202. In embodiments, the light source 1200 may provide light to a backlighting optical system 1004 as described above in connection with FIG. 10. In embodiments, the light source 1200 includes a quantum dot cover glass 1202. Where the quantum dots absorb light of a shorter wavelength and emit light of a longer wavelength (FIG. 12*a* shows an example wherein a UV spectrum 1202 applied to a quantum dot results in the quantum dot emitting a narrow band shown as a PL spectrum 1204) that is dependent on the material makeup and size of the quantum dot. As a result, quantum dots in the quantum dot cover glass 1202 can be tailored to provide one or more bands of narrow bandwidth light (e.g. red, green and blue emissions dependent on the different quantum dots included as illustrated in the graph shown in FIG. 12*b* where three different quantum dots are used. In embodiments, the LED driver light emits UV light, deep blue or blue light. For sequential illumination of different colors, multiple light sources 1200 would be used where each light source 1200 would include a quantum dot cover glass 1202 with a single type of quantum dot selected to emit at one of the desired colors. The light source 1200 can be used in connection with a combiner 602 with a holographic mirror or tristimulus notch mirror to provide narrow bands of light that are reflected toward the wearer's eye with less waste light that does not get reflected.

Another aspect of the present invention relates to the generation of peripheral image lighting effects for a person wearing a HWC. In embodiments, a solid state lighting system (e.g. LED, OLED, etc.), or other lighting system, may be included inside the optical elements of an lower optical module 204. The solid state lighting system may be arranged such that lighting effects outside of a field of view (FOV) of the presented digital content is presented to create an immersive effect for the person wearing the HWC. To this end, the lighting effects may be presented to any portion of the HWC that is visible to the wearer. The solid state lighting system may be digitally controlled by an integrated processor on the HWC. In embodiments, the integrated processor will control the lighting effects in coordination with digital content that is presented within the FOV of the HWC. For example, a movie, picture, game, or other content, may be displayed or playing within the FOV of the HWC. The content may show a bomb blast on the right side of the FOV and at the same moment, the solid state lighting system inside of the upper module optics may flash quickly in concert with the FOV image effect. The effect may not be fast, it may be more persistent to indicate, for example, a general glow or color on one side of the user. The solid state lighting system may be color controlled, with red, green and blue LEDs, for example, such that color control can be coordinated with the digitally presented content within the field of view.

Figure 13A:
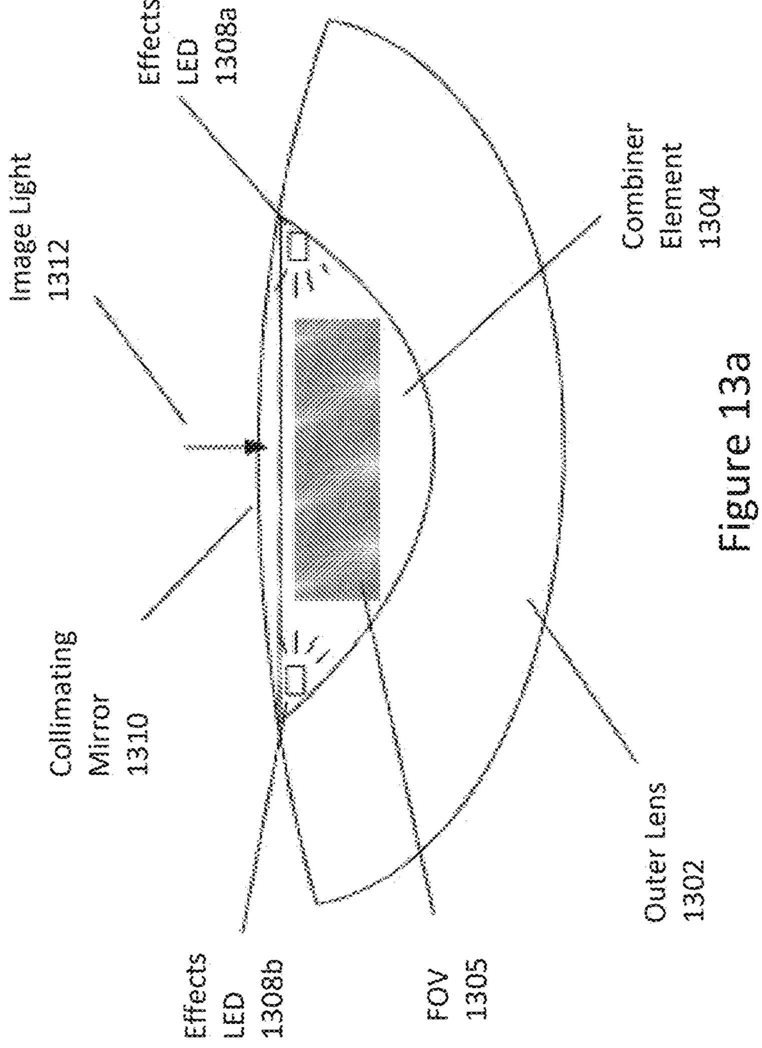
FIG. 13*a* illustrates a peripheral lighting effects system according to the principles of the present invention.

FIG. 13*a* illustrates optical components of a lower optical module 204 together with an outer lens 1302. FIG. 13*a* also shows an embodiment including effects LED's 1308*a* and 1308*b*. FIG. 13*a* illustrates image light 1312, as described herein elsewhere, directed into the upper optical module where it will reflect off of the combiner element 1304, as described herein elsewhere. The combiner element 1304 in this embodiment is angled towards the wearer's eye at the top of the module and away from the wearer's eye at the bottom of the module, as also illustrated and described in connection with FIG. 8 (e.g. at a 45 degree angle). The image light 1312 provided by an upper optical module 202 (not shown in FIG. 13*a*) reflects off of the combiner element 1304 towards the collimating mirror 1310, away from the wearer's eye, as described herein elsewhere. The image light 1312 then reflects and focuses off of the collimating mirror 1304, passes back through the combiner element 1304, and is directed into the wearer's eye. The wearer can also view the surrounding environment through the transparency of the combiner element 1304, collimating mirror 1310, and outer lens 1302 (if it is included). As described herein elsewhere, various surfaces are polarized to create the optical path for the image light and to provide transparency of the elements such that the wearer can view the surrounding environment. The wearer will generally perceive that the image light forms an image in the FOV 1305. In embodiments, the outer lens 1302 may be included. The outer lens 1302 is an outer lens that may or may not be corrective and it may be designed to conceal the lower optical module components in an effort to make the HWC appear to be in a form similar to standard glasses or sunglasses.

In the embodiment illustrated in FIG. 13*a*, the effects LEDs 1308*a* and 1308*b* are positioned at the sides of the combiner element 1304 and the outer lens 1302 and/or the collimating mirror 1310. In embodiments, the effects LEDs 1308*a* are positioned within the confines defined by the combiner element 1304 and the outer lens 1302 and/or the collimating mirror. The effects LEDs 1308*a* and 1308*b* are also positioned outside of the FOV 1305. In this arrangement, the effects LEDs 1308*a* and 1308*b* can provide lighting effects within the lower optical module outside of the FOV 1305. In embodiments the light emitted from the effects LEDs 1308*a* and 1308*b* may be polarized such that the light passes through the combiner element 1304 toward the wearer's eye and does not pass through the outer lens 1302 and/or the collimating mirror 1310. This arrangement provides peripheral lighting effects to the wearer in a more private setting by not transmitting the lighting effects through the front of the HWC into the surrounding environment. However, in other embodiments, the effects LEDs 1308*a* and 1308*b* may be unpolarized so the lighting effects provided are made to be purposefully viewable by others in the environment for entertainment such as giving the effect of the wearer's eye glowing in correspondence to the image content being viewed by the wearer.

Figure 13B:
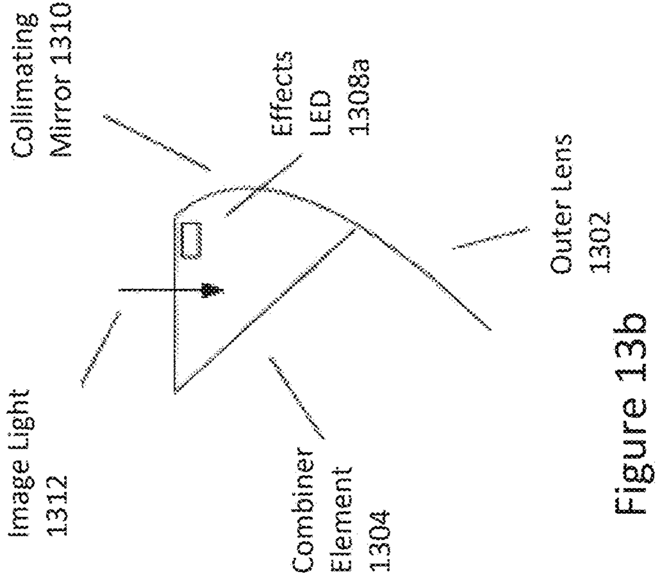
FIG. 13*b* illustrates a peripheral lighting effects system according to the principles of the present invention.

FIG. 13*b* illustrates a cross section of the embodiment described in connection with FIG. 13*a*. As illustrated, the effects LED 1308*a* is located in the upper-front area inside of the optical components of the lower optical module. It should be understood that the effects LED 1308*a* position in the described embodiments is only illustrative and alternate placements are encompassed by the present invention. Additionally, in embodiments, there may be one or more effects LEDs 1308*a* in each of the two sides of HWC to provide peripheral lighting effects near one or both eyes of the wearer.

Figure 13C:
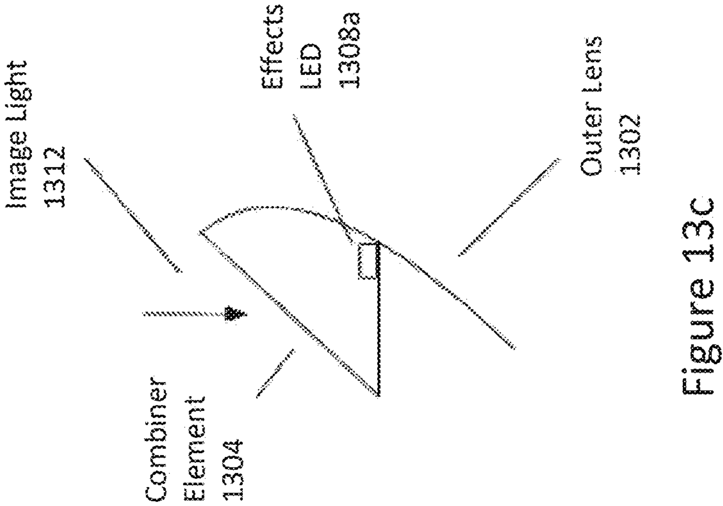
FIG. 13*c* illustrates a peripheral lighting effects system according to the principles of the present invention.

FIG. 13*c* illustrates an embodiment where the combiner element 1304 is angled away from the eye at the top and towards the eye at the bottom (e.g. in accordance with the holographic or notch filter embodiments described herein). In this embodiment, the effects LED 1308*a* is located on the outer lens 1302 side of the combiner element 1304 to provide a concealed appearance of the lighting effects. As with other embodiments, the effects LED 1308*a* of FIG. 13*c* may include a polarizer such that the emitted light can pass through a polarized element associated with the combiner element 1304 and be blocked by a polarized element associated with the outer lens 1302.

Another aspect of the present invention relates to the mitigation of light escaping from the space between the wearer's face and the HWC itself. Another aspect of the present invention relates to maintaining a controlled lighting environment in proximity to the wearer's eyes. In embodiments, both the maintenance of the lighting environment and the mitigation of light escape are accomplished by including a removable and replaceable flexible shield for the HWC. Wherein the removable and replaceable shield can be provided for one eye or both eyes in correspondence to the use of the displays for each eye. For example, in a night vision application, the display to only one eye could be used for night vision while the display to the other eye is turned off to provide good see-through when moving between areas where visible light is available and dark areas where night vision enhancement is needed.

Figure 14A:
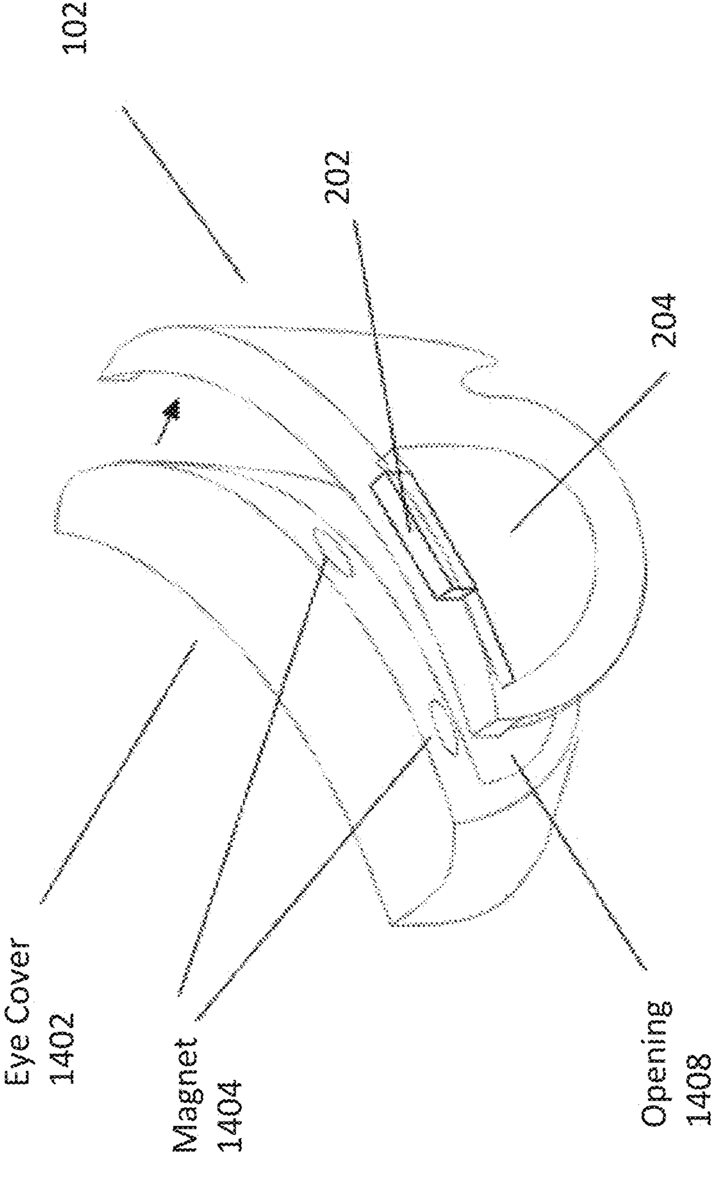
FIG. 14*a* illustrates an eye cover according to the principles of the present invention.
Figure 14B:
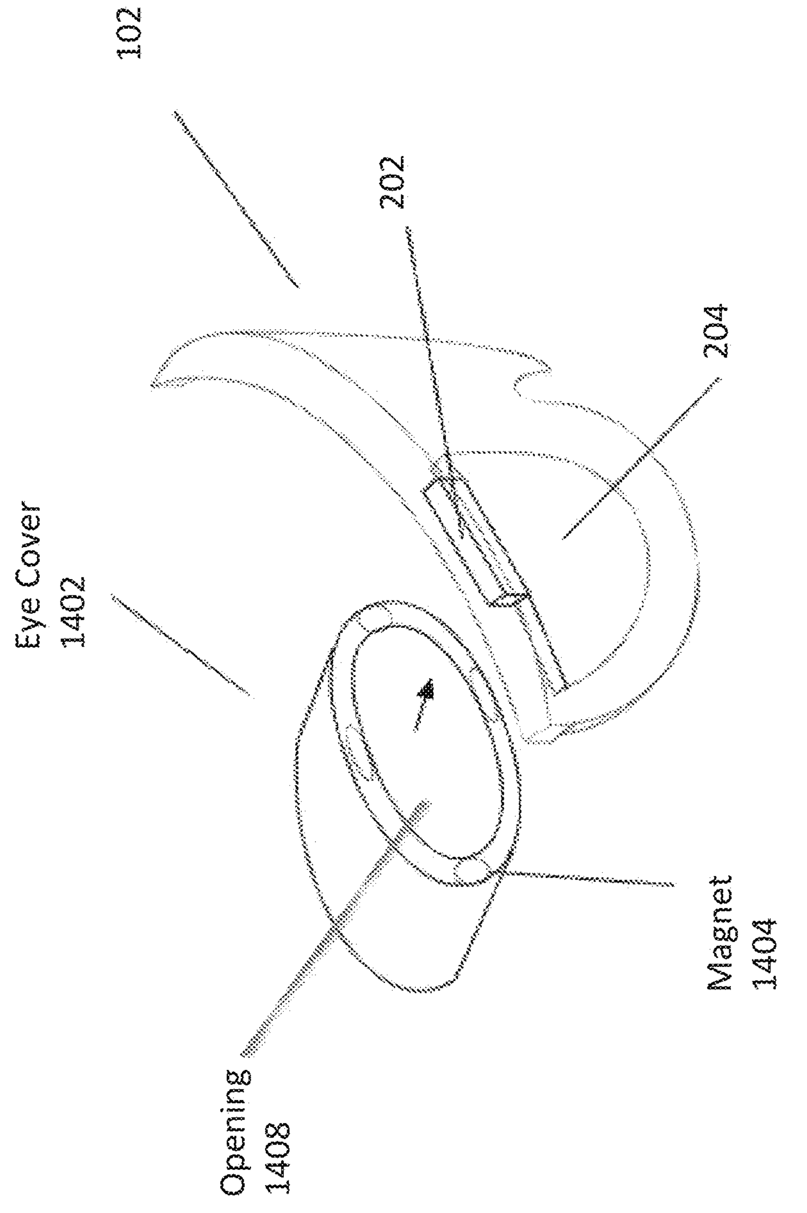
FIG. 14*b* illustrates an eye cover according to the principles of the present invention.

FIG. 14*a* illustrates a removable and replaceable flexible eye cover 1402 with an opening 1408 that can be attached and removed quickly from the HWC 102 through the use of magnets. Other attachment methods may be used, but for illustration of the present invention we will focus on a magnet implementation. In embodiments, magnets may be included in the eye cover 1402 and magnets of an opposite polarity may be included (e.g. embedded) in the frame of the HWC 102. The magnets of the two elements would attract quite strongly with the opposite polarity configuration. In another embodiment, one of the elements may have a magnet and the other side may have metal for the attraction. In embodiments, the eye cover 1402 is a flexible elastomeric shield. In embodiments, the eye cover 1402 may be an elastomeric bellows design to accommodate flexibility and more closely align with the wearer's face. FIG. 14*b* illustrates a removable and replaceable flexible eye cover 1404 that is adapted as a single eye cover. In embodiments, a single eye cover may be used for each side of the HWC to cover both eyes of the wearer. In embodiments, the single eye cover may be used in connection with a HWC that includes only one computer display for one eye. These configurations prevent light that is generated and directed generally towards the wearer's face by covering the space between the wearer's face and the HWC. The opening 1408 allows the wearer to look through the opening 1408 to view the displayed content and the surrounding environment through the front of the HWC. The image light in the lower optical module 204 can be prevented from emitting from the front of the HWC through internal optics polarization schemes, as described herein, for example.

Figure 14C:
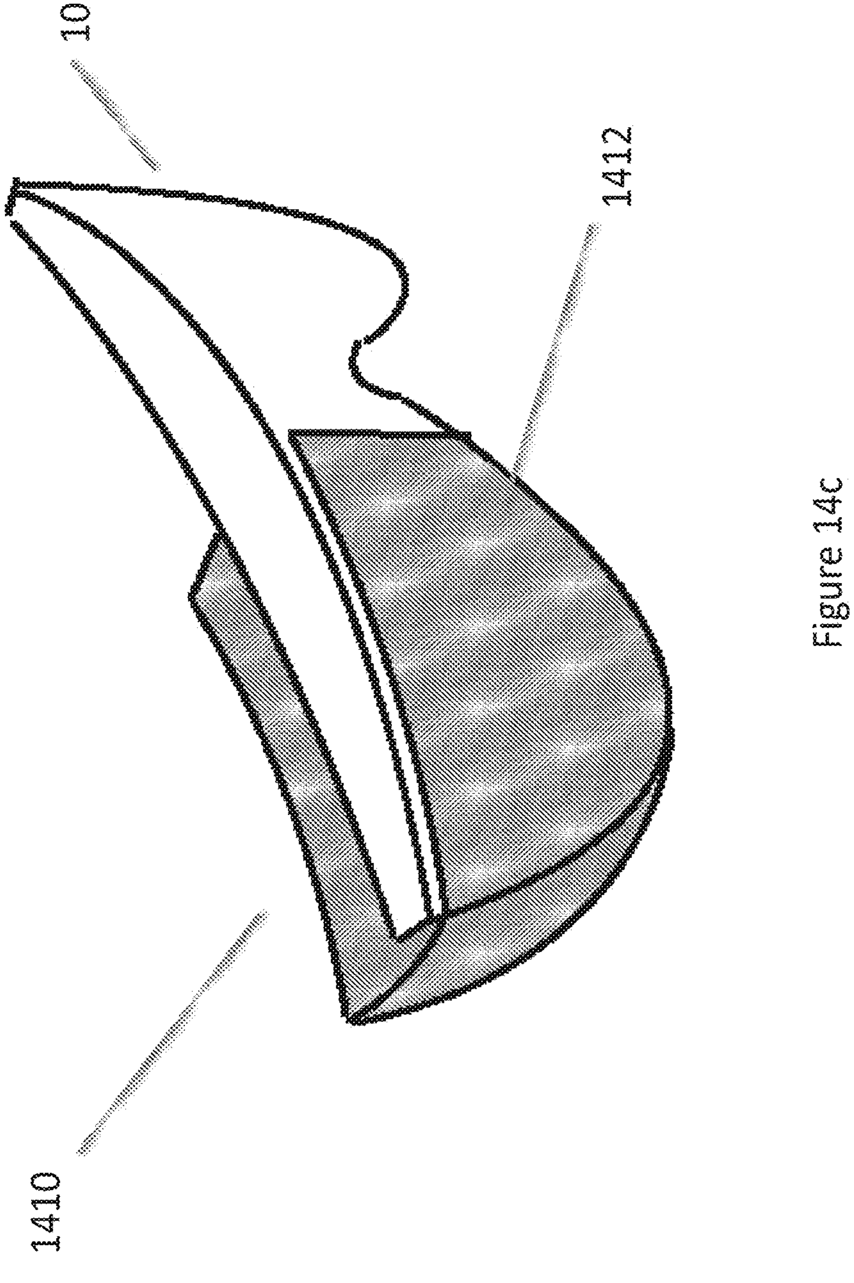
FIG. 14*c* illustrates an eye cover according to the principles of the present invention.

FIG. 14*c* illustrates another embodiment of a light suppression system. In this embodiment, the eye cover 1410 may be similar to the eye cover 1402, but eye cover 1410 includes a front light shield 1412. The front light shield 1412 may be opaque to prevent light from escaping the front lens of the HWC. In other embodiments, the front light shield 1412 is polarized to prevent light from escaping the front lens. In a polarized arrangement, in embodiments, the internal optical elements of the HWC (e.g. of the lower optical module 204) may polarize light transmitted towards the front of the HWC and the front light shield 1412 may be polarized to prevent the light from transmitting through the front light shield 1412.

In embodiments, an opaque front light shield 1412 may be included and the digital content may include images of the surrounding environment such that the wearer can visualize the surrounding environment. One eye may be presented with night vision environmental imagery and this eye's surrounding environment optical path may be covered using an opaque front light shield 1412. In other embodiments, this arrangement may be associated with both eyes.

Another aspect of the present invention relates to automatically configuring the lighting system(s) used in the HWC 102. In embodiments, the display lighting and/or effects lighting, as described herein, may be controlled in a manner suitable for when an eye cover 1408 is attached or removed from the HWC 102. For example, at night, when the light in the environment is low, the lighting system(s) in the HWC may go into a low light mode to further control any amounts of stray light escaping from the HWC and the areas around the HWC. Covert operations at night, while using night vision or standard vision, may require a solution which prevents as much escaping light as possible so a user may clip on the eye cover(s) 1408 and then the HWC may go into a low light mode. The low light mode may, in some embodiments, only go into a low light mode when the eye cover 1408 is attached if the HWC identifies that the environment is in low light conditions (e.g. through environment light level sensor detection). In embodiments, the low light level may be determined to be at an intermediate point between full and low light dependent on environmental conditions.

Another aspect of the present invention relates to automatically controlling the type of content displayed in the HWC when eye covers 1408 are attached or removed from the HWC. In embodiments, when the eye cover(s) 1408 is attached to the HWC, the displayed content may be restricted in amount or in color amounts. For example, the display(s) may go into a simple content delivery mode to restrict the amount of information displayed. This may be done to reduce the amount of light produced by the display(s). In an embodiment, the display(s) may change from color displays to monochrome displays to reduce the amount of light produced. In an embodiment, the monochrome lighting may be red to limit the impact on the wearer's eyes to maintain an ability to see better in the dark.

Although embodiments of HWC have been described in language specific to features, systems, computer processes and/or methods, the appended claims are not necessarily limited to the specific features, systems, computer processes and/or methods described. Rather, the specific features, systems, computer processes and/or and methods are disclosed as non-limited example implementations of HWC.

All documents referenced herein are hereby incorporated by reference.

We claim:

1. A system comprising:

one or more processors;

a display;

an eyeglasses frame coupled to the display; and a magnetic attachment configured to physically couple to the eyeglasses frame, wherein:

the magnetic attachment is configured to decouple from the eyeglasses frame by disengaging a magnetic connection, the display is configured to communicate with the one or more processors, and the one or more processors are configured to perform a method comprising:

determining whether the magnetic attachment is physically coupled to the eyeglasses frame;

in accordance with a determination that the magnetic attachment is physically coupled to the eyeglasses frame:

presenting first content, via the display, to a first eye of a user in a first display mode; and presenting, via the display, second content to a second eye of the user in a second display mode different from the first display mode; and in accordance with a determination that the magnetic attachment is not physically coupled to the eyeglasses frame:

presenting the first content, via the display, to the first eye of the user in the second display mode; and presenting, via the display, the second content to the second eye of the user in the second display mode.

2. The system of claim 1, wherein the magnetic attachment is further configured to contact the user of the wearable head device.

3. The system of claim 1, wherein the magnetic attachment is further configured to encapsulate the first eye and the second eye of the user of the wearable head device.

4. The system of claim 1, wherein the first display mode comprises a low-light display mode.

5. The system of claim 1, wherein the magnetic attachment comprises a flexible material.

6. The system of claim 1, wherein the magnetic attachment comprises a bellows.

7. The system of claim 1, further comprising a front lens and a light shield, wherein:

a light source is configured to transmit light toward an exterior of the wearable head device via the front lens, and the light shield is configured to suppress the light transmitted toward the exterior of the wearable head device via the front lens.

8. The system of claim 7, wherein the light transmitted toward the exterior of the wearable head device via the front lens has a first polarization, and the light shield is configured to suppress light having the first polarization.

9. The system of claim 1, wherein the display is configured to present a view of an environment of the user.

10. The system of claim 9, wherein the view comprises a night vision view of the environment.

11. The system of claim 1, wherein the first content is presented to the first eye of the user via the display in the first display mode further in accordance with a determination that a light level of an environment of the user is below a threshold light level.

12. The system of claim 1, wherein the presenting the first content in the first display mode comprises presenting monochrome light.

13. The system of claim 1, wherein:

the presenting the first content in the first display mode comprises presenting the first content at a first intensity, the presenting the first content and the second content in the second display mode comprises presenting the light at a second intensity, and the second intensity is higher than the first intensity.

14. The system of claim 1, wherein the magnetic attachment comprises an eye cover.

15. A method comprising:

determining whether a magnetic attachment is physically coupled to an eyeglasses frame, wherein:

the magnetic attachment is configured to decouple from the eyeglasses frame by disengaging a magnetic connection, and the eyeglasses frame is coupled to a display;

in accordance with a determination that the magnetic attachment is physically coupled to the eyeglasses frame:

presenting first content, via the display, to a first eye of a user in a first display mode; and presenting, via the display, second content to a second eye of the user in a second display mode different from the first display mode; and in accordance with a determination that the magnetic attachment is not physically coupled to the eyeglasses frame:

presenting the first content, via the display, to the first eye of the user in the second display mode; and presenting, via the display, the second content to the second eye of the user in the second display mode.

16. The method of claim 15, wherein the first display mode comprises a low-light display mode.

17. The method of claim 15, wherein the magnetic attachment comprises a flexible material.

18. The method of claim 15, wherein the display is configured to present a view of an environment of the user.

19. The method of claim 15, wherein:

the presenting the first content in the first display mode comprises presenting the first content at a first intensity, the presenting the first content and the second content in the second display mode comprises presenting the light at a second intensity, and the second intensity is higher than the first intensity.

20. The method of claim 15, wherein the magnetic attachment comprises an eye cover.

* * * * *